(12) United States Patent
Muraishi

(10) Patent No.: US 11,196,898 B2
(45) Date of Patent: Dec. 7, 2021

(54) IMAGE READING APPARATUS, METHOD OF CONTROLLING IMAGE READING APPARATUS, AND STORAGE MEDIUM

(71) Applicant: CANON KABUSHIKI KAISHA, Tokyo (JP)

(72) Inventor: Masaaki Muraishi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/145,832

(22) Filed: Jan. 11, 2021

(65) Prior Publication Data

US 2021/0227098 A1    Jul. 22, 2021

(30) Foreign Application Priority Data

Jan. 22, 2020 (JP) .............................. JP2020-008775

(51) Int. Cl.
  *H04N 1/62* (2006.01)
  *H04N 1/00* (2006.01)

(52) U.S. Cl.
  CPC ........... *H04N 1/62* (2013.01); *H04N 1/00037* (2013.01)

(58) Field of Classification Search
  CPC ............................ H04N 1/62; H04N 1/00037
  See application file for complete search history.

(56) References Cited

U.S. PATENT DOCUMENTS

2017/0331984 A1\* 11/2017 Akagi .................. H04N 1/1932

FOREIGN PATENT DOCUMENTS

JP         2017204805 A    5/2016

\* cited by examiner

*Primary Examiner* — Christopher Wait
(74) *Attorney, Agent, or Firm* — Canon U.S.A., Inc. IP Division

(57) ABSTRACT

An apparatus corrects a piece of pixel data of a first color of which abnormal pixel is detected in a first color without correcting a piece of pixel data of a second color of which abnormal pixel is not detected in the second color, in the generated pieces of pixel data in a case where the abnormal pixel is a pixel other than a pixel located at an edge portion, and corrects a plurality of pieces of pixel data of all colors at a position where the abnormal pixel is detected in the generated plurality of pieces of pixel data in a case where the detected abnormal pixel is the pixel located at the edge portion.

19 Claims, 23 Drawing Sheets

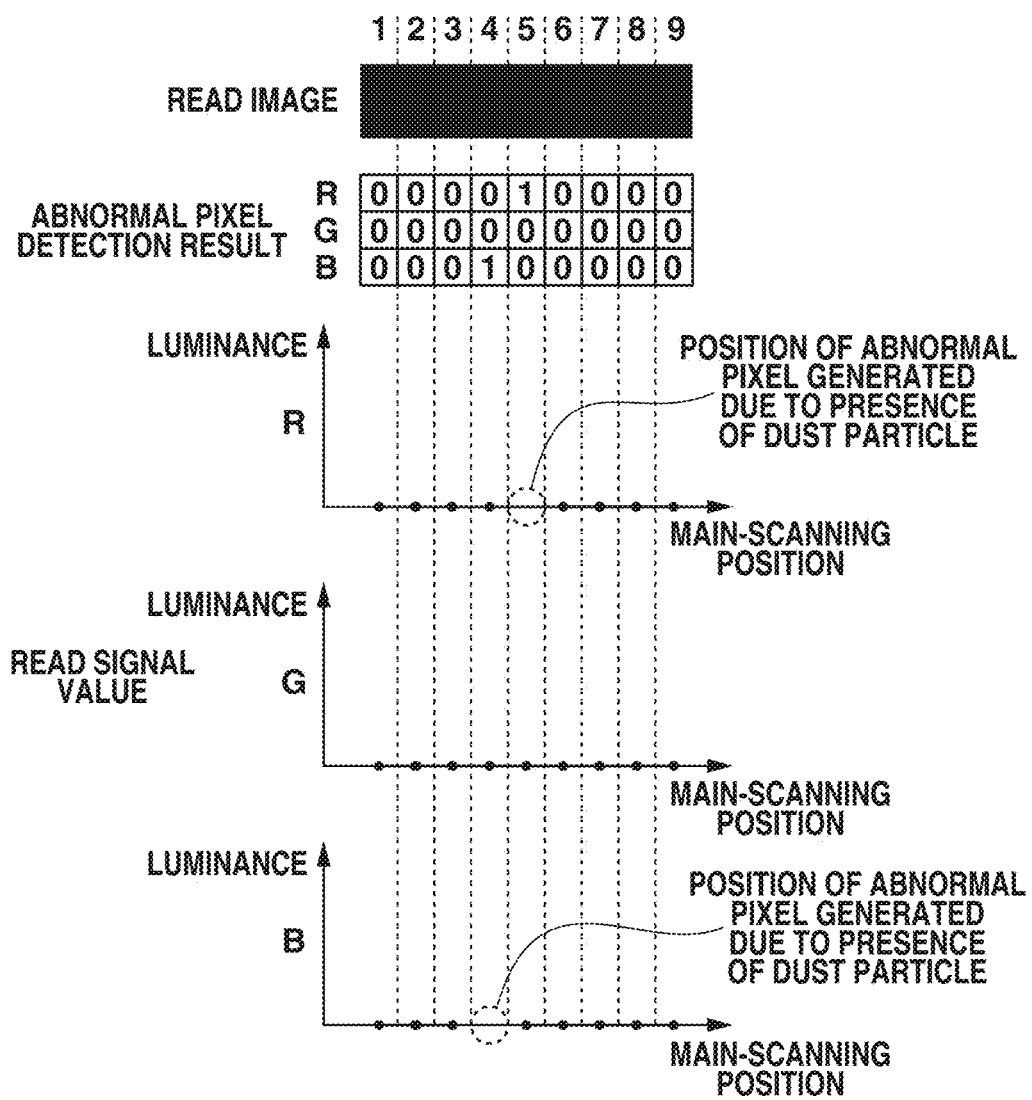

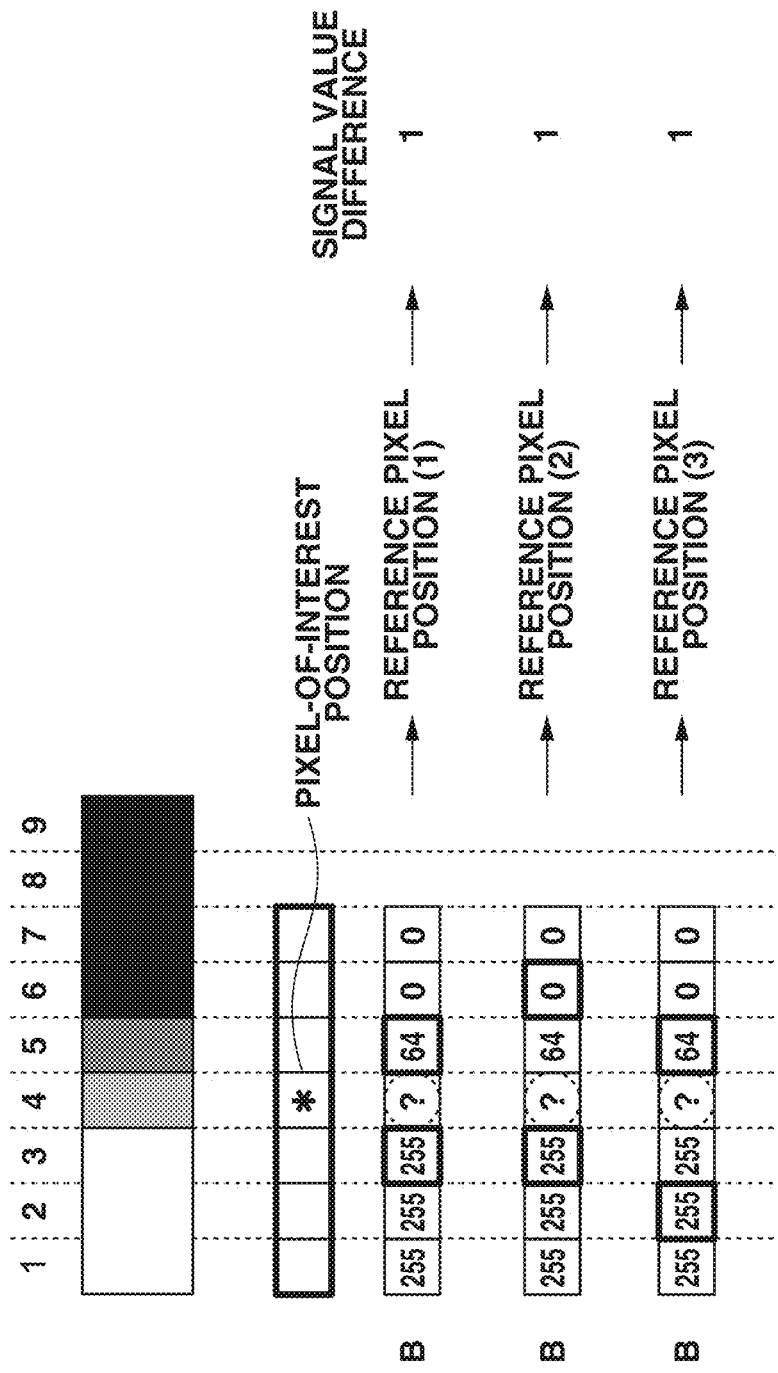

| No | ABNORMAL PIXEL DETECTION RESULT | | | | | | |
|---|---|---|---|---|---|---|---|
| 1 | — | — | 0 | 1 | 0 | — | — |
| 2 | — | — | 0 | 1 | 1 | 0 | — |
| 3 | — | 0 | 1 | 1 | 0 | — | — |

IMAGE READING APPARATUS, METHOD OF CONTROLLING IMAGE READING APPARATUS, AND STORAGE MEDIUM

BACKGROUND OF THE DISCLOSURE

Field of the Disclosure

The aspect of the embodiments relates to image reading apparatuses, a method of controlling an image reading apparatus, and a storage medium.

Description of the Related Art

A copying machine and a multi-function printer include an image reading apparatus for reading images on documents. Among reading methods employed by the image reading apparatus, there are two known methods: a platen reading method in which a document is placed on a platen glass and in which an image on the document is read while the reading unit is moved, and a scanning method for reading an image on the document while the document is conveyed by an auto document feeder (ADF).

In the scan method using the ADF, the position where an image is read is fixed. As a result, if dust particles such as paper dust and dust which are carried while the document is conveyed are present on a reading position, streaky abnormal pixels are generated on the read image.

Against this issue, Japanese Patent Application Laid-Open No. 2017-204805 discusses a technique in which when dust particles are present on a reading position, the dust particles are automatically detected and correction processing is performed by image processing.

In the technique discussed in Japanese Patent Application Laid-Open No. 2017-204805, an abnormal pixel is detected, and the detected abnormal pixel is corrected by linear interpolation using the vales of pixels adjacent to the abnormal pixel. If the pixel width of the abnormal pixel is larger than or equal to a predetermined size, correction processing based on the adjacent pixels is applied to all the colors at the position of the abnormal pixel, thereby reducing the occurrence of coloring due to the correction processing. If the pixel width of the abnormal pixel is smaller than the predetermined size, correction processing based on adjacent pixels is applied to each color for which dust particles are detected, thereby performing correction processing to make a correction mark less noticeable.

In the method discussed in Japanese Patent Application Laid-Open No. 2017-204805, correction processing based on pixels adjacent to an abnormal pixel with a size less than a predetermined size is performed on each color for which dust particles are detected. If correction processing on a black edge portion is performed by linear interpolation on, for example, the red signal, the signal value of the red signal varies at the edge portion. Consequently, differences between signal values of red, green, and blue signals increase, which causes coloring in the edge portion. The occurrence of a false color results in degradation in image quality and a false determination in auto color select (ACS) (determining a black-and-white document to be a color document).

SUMMARY OF THE DISCLOSURE

According to an aspect of the embodiments, an apparatus includes a reading unit configured to read an image on a document and generate a plurality of pieces of pixel data of a plurality of colors, a detection unit configured to detect, for each color, an abnormal pixel that is not present in the image, a determination unit configured to determine whether the detected abnormal pixel is a pixel located at an edge portion, and a correction unit configured to correct a piece of pixel data of a first color of which the abnormal pixel is detected in the first color without correcting a piece of pixel data of a second color of which the abnormal pixel is not detected in the second color, in the generated plurality of pieces of pixel data in a case where the determination unit determines the detected abnormal pixel is a pixel other than the pixel located at the edge portion, and to correct a plurality of pieces of pixel data of all colors at a position where the abnormal pixel is detected in the generated plurality of pieces of pixel data in a case where the determination unit determines the detected abnormal pixel tis the pixel located at the edge portion.

Further features of the disclosure will become apparent from the following description of exemplary embodiments with reference to the attached drawings.

BRIEF DESCRIPTION OF THE DRAWINGS

FIGS. 9A and 9B each illustrate an example of correction processing according to the first exemplary embodiment.

FIG. 11 illustrates an example of difference detection processing according to the first exemplary embodiment.

FIGS. 16A and 16B each illustrate abnormal pixel flag generation processing according to the second exemplary embodiment.

FIG. 18 illustrates an example of matching patterns for a determination processing unit according to the second exemplary embodiment.

DESCRIPTION OF THE EMBODIMENTS

Exemplary embodiments of the disclosure will be described in detail below with reference to the drawings. The following exemplary embodiments are not intended to limit the disclosure described in the claims, and not all combinations of features described in the exemplary embodiments are used for the solving means of the disclosure.

Figure 1:
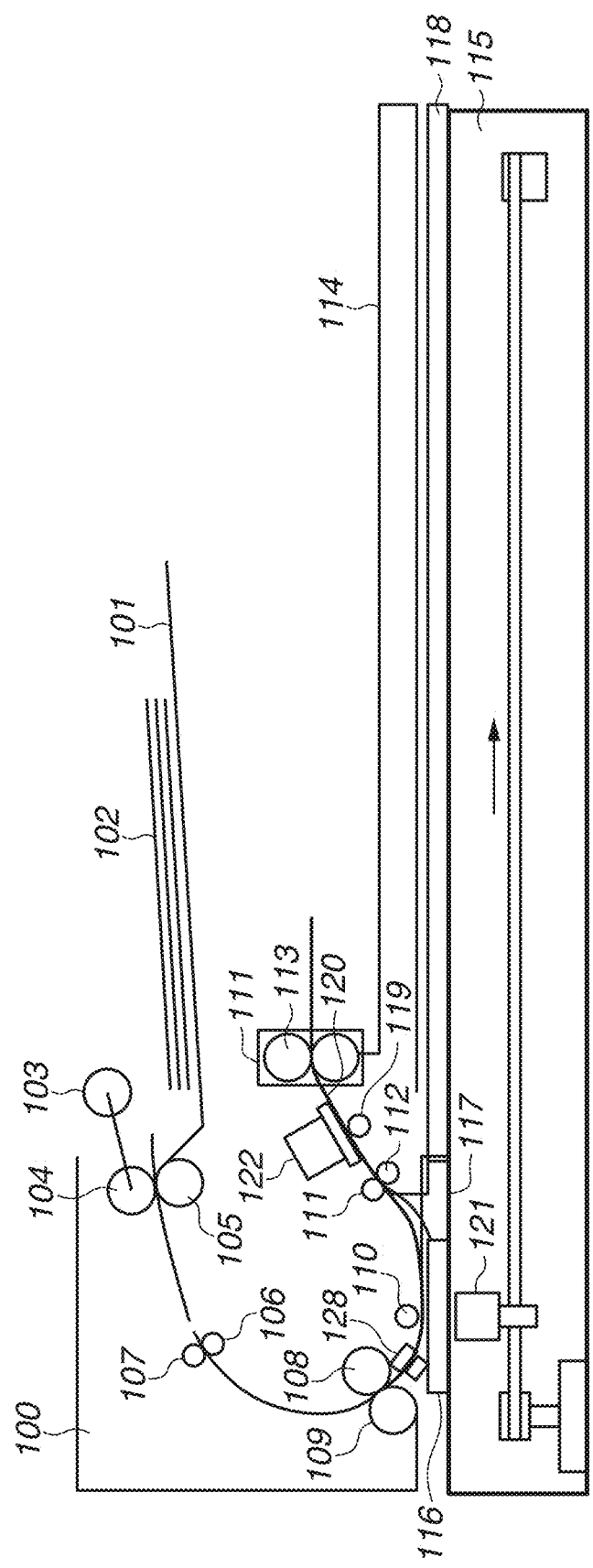
FIG. 1 illustrates an automatic document feeding apparatus and an image reading apparatus according to a first exemplary embodiment.

FIG. 1 illustrates an example of an image reading apparatus suitable for applying an exemplary embodiment of the disclosure.

The image reading apparatus according to a first exemplary embodiment incorporates an automatic document feeding apparatus 100, which includes a front surface reading unit 121 and a back surface reading unit 122 to read images on both sides of each sheet of the document 102 while the individual sheets of a document 102 as image reading targets each are being conveyed.

A sheet feed roller 103 is connected to a driving source (e.g., a motor) that drives a separation/conveyance roller 104. The rotation of the driving source turns the sheet feed roller 103 to feed the document 102. The sheet feed roller 103 out of operation is retracted to a home position, which is an upper position in FIG. 1, not to hamper document setting operation. In response to the start of sheet feeding operation, the sheet feed roller 103 descends and comes into contact with the top surface of the document 102. The sheet feed roller 103 is rotatably supported by an arm (not illustrated) that rocks to move the sheet feed roller 103 vertically.

A separation/conveyance driven roller 105 is disposed on the opposite side of the separation/conveyance roller 104 with the separation/conveyance driven roller 105 pressed against the separation/conveyance roller 104. The separation/conveyance driven roller 105 is formed of rubber or other material that has a slightly less frictional resistance than that of the separation/conveyance roller 104. The separation/conveyance driven roller 105 operates in conjunction with the separation/conveyance roller 104 to separate the individual sheets of the documents 102 on a document tray 101 one by one, and each separated sheet is fed by the sheet feed roller 103.

Further, the automatic document feeding apparatus 100 includes a registration roller 106, a registration driven roller 107, a lead roller 108, and a lead driven roller 109. The registration roller 106 and the registration driven roller 107 operate to position leading edges of the fed individual sheets of the document 102 at a separation portion.

The lead roller 108 and the lead driven roller 109 convey each sheet of the document 102 toward a scan glass 116. A document detection sensor 128 is a sensor that detects the leading edge of each sheet of the document 102 being conveyed. A platen roller 110 is disposed over the scan glass 116. After passing over the scan glass 116, which is configured to be a first reading unit, each sheet of the document 102 is conveyed to a lead discharge roller 111 and a lead discharge driven roller 112 by the platen roller 110.

At the end of the scan glass 116 nearer to the lead discharge roller 111, a jump base 117 for guiding each sheet of the document 102 upward is provided to convey the sheets of the document 102 smoothly to the lead discharge roller 111.

Each sheet of the document 102 is conveyed so that one surface of the sheet comes into contact with the scan glass 116. At that time, the front surface reading unit 121 disposed in an image reading device 115 reads an image on the front surface (first surface) of each sheet of the document 102 through the scan glass 116. The front surface reading unit 121 includes a line sensor. The line sensor includes an R-sensor, a G-sensor, and a B-sensor. The R-sensor detects red light and generates digital data. The G-sensor detects green light and generates digital data. The B-sensor detects blue light and generates digital data. The configuration of the line sensor will be described in detail below.

The lead discharge roller 111 and the lead discharge driven roller 112 convey each sheet of the document 102, which has passed over the scan glass 116, to a scan glass 120. A platen roller 119 in white color is provided on one side of the scan glass 120. On the other side is provided the back surface reading unit 122. As with the front surface reading unit 121, the back surface reading unit 122 includes a line sensor.

With this configuration, an image on the back surface (second surface) of each sheet of the document 102, which has passed through between the scan glass 120 and the platen roller 119, is read by the back surface reading unit 122. After that, each sheet of the document 102 is conveyed to a discharge roller 113 and is then discharged onto a discharge tray 114.

The image reading apparatus with the above-described configuration reads a document in two modes. A first mode is a fixed document reading mode in which a document placed on a platen glass 118 is read by the front surface reading unit 121 being moved in a sub-scanning direction (the direction indicated by the arrow in FIG. 1). A second mode is a scan mode in which each sheet of the document 102 is read at the position of the scan glass 116 by the automatic document feeding apparatus 100 conveying each sheet of the document 102 with the front surface reading unit 121 stopped. The second mode enables not the image on the front surface of each sheet of the document 102, but also the image on the back surface of each sheet of the document 102 to be read by using the back surface reading unit 122 in addition to the front surface reading unit 121. FIG. 1 is a diagram illustrating the second mode. Thus, the document 102 to be read in the first mode is not illustrated in FIG. 1.

<Configuration of Reading Unit>

Figure 2:
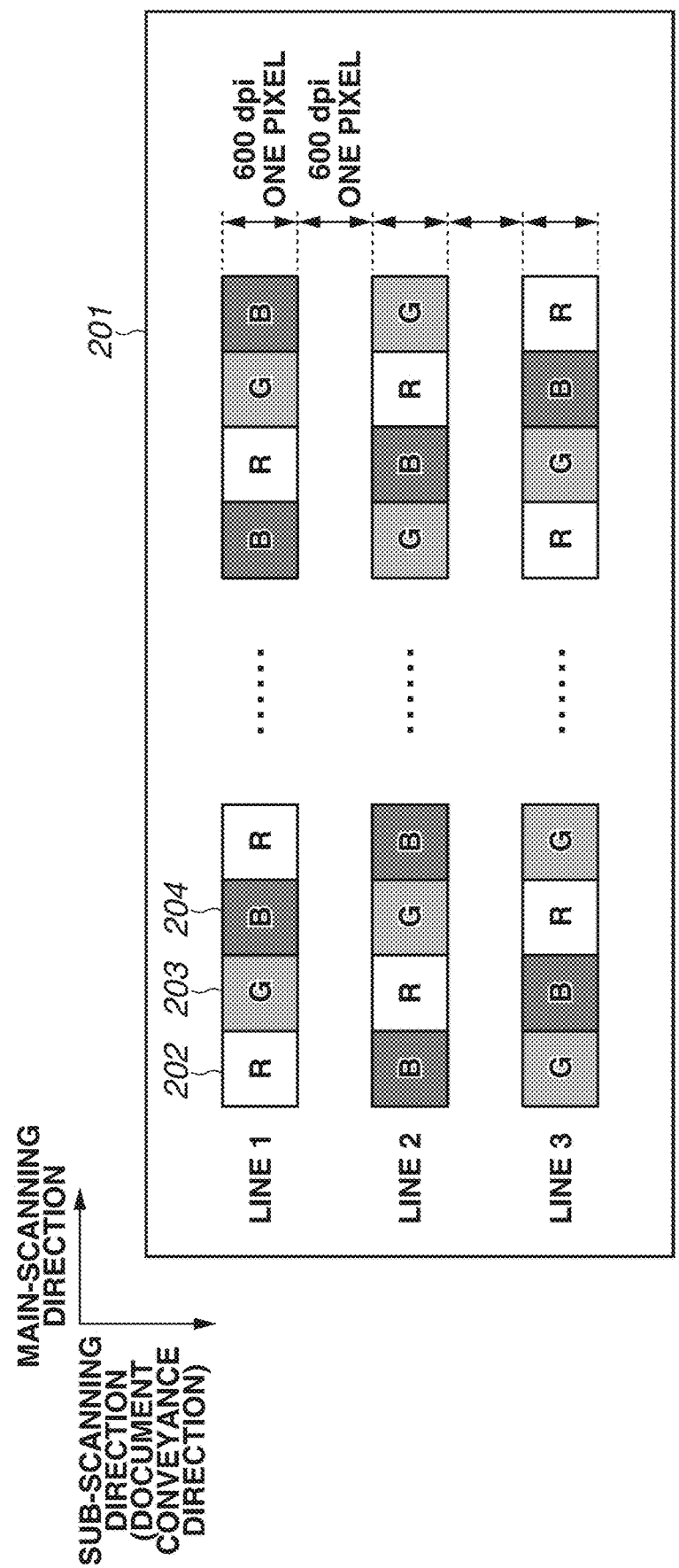
FIG. 2 is a diagram of the configuration of a line sensor according to the first exemplary embodiment.

FIG. 2 is a diagram illustrating an array structure of light-receiving elements of the line sensor in the front surface reading unit 121. The back surface reading unit 122 has a structure similar to that of the front surface reading unit 121, and thus the description thereof is omitted.

A line sensor 201 is, for example, a charge-coupled device (CCD) linear image sensor. The line sensor 201 includes a plurality of light-receiving elements disposed, which receive light emitted on and reflected from a sheet of the document 102. One light-receiving element corresponds to one pixel, and the width of one light-receiving element corresponds to a one-pixel width. For example, a three-pixel width means the width of three light-receiving elements. As for pixels in describing images on the document 102, the image read by a light-receiving element of one pixel in the line sensor 201 is an image in one pixel (a one-pixel width). The light-receiving elements include a first light-receiving element for detecting red light (first color: R), a second light-receiving element for detecting green light (second color: G), and a third light-receiving element for detecting blue light (third color: B). Light-receiving elements of R, light-receiving elements of G, and light-receiving elements of B, each of which has a one pixel width, are disposed in order in a predetermined direction at regular intervals. Thus, a light-receiving element column of a repeated pattern of R→G→B is formed in the direction. The line sensor 201 has such a plurality of light-receiving element columns disposed. A pixel corresponding to a light-receiving element that receives red light is herein referred to as an R-pixel (pixel data representing red). A pixel corresponding to a light-receiving element that receives green light is herein referred to as a G-pixel (pixel data representing green). A pixel corresponding to a light-receiving element that receives blue light is herein referred to as a B-pixel (pixel data representing blue). Each formed of a light-receiving element column in a first direction is referred to as a "line". One line is formed of one light-receiving element column. The line sensor 201 has a plurality of lines arranged at predetermined intervals in a second direction perpendicular to the first direction, each line of which constitutes one light-receiving element column.

The line sensor 201 is configured to read 7500 pixels in the main-scanning direction which is the first direction, and to read three lines in the sub-scanning direction which is the second direction perpendicular to the first direction. The present exemplary embodiment is described assuming that an image is read at a resolution of 600 dots per inch (dpi) in the main-scanning direction. However, this resolution is merely an example. The main-scanning direction is a direction in which a plurality of light receiving elements is disposed in a row, and is a direction corresponding to a document width direction (the direction perpendicular to a conveyance direction) while the document is being read. The sub-scanning direction is a direction perpendicular to the main-scanning direction, and is a direction corresponding to the document conveyance direction while the document is being read.

The three-line light-receiving element columns are disposed away from one another at a predetermined pixel width (a predetermined interval) in the sub-scanning direction, and are arranged such that the color of a pixel located at the start end in the cycle of R→G→B is different from those of the pixels at their start ends in the other adjacent columns. In the example illustrated in FIG. 2, the interval between lines corresponds to one pixel. As a result, the light-receiving element column at a line 1 and the light-receiving element column at a line 2 are spaced by two pixels in the sub-scanning direction, the light-receiving element column at the line 1 and the light-receiving element column at a line 3 are spaced by four pixels in the sub-scanning direction. In the main-scanning direction, the colors of pixels are arranged in an orderly pattern such as R→G→B→R→G→B→ . . . . As viewed along the sub-scanning direction, the regular pattern of the line 2 is shifted from that of the line 1 by one pixel in the main-scanning direction. The regular pattern of the line 3 is shifted from that of the line 1 by two pixels in the main-scanning direction. Thus, the light-receiving elements for R, G, and B in the line sensor 201 are disposed in a so-called staggered arrangement. In other words, light receiving elements of a color are not arranged in a row across the first light receiving element column, the second light receiving element column, and the third light receiving element column. In reading the document 102, the line sensor 201 outputs detection results of signals from individual elements spaced apart from one another by the number of pixels described above.

The light-receiving elements in the lines 1 to 3 each include light-transmitting members 202 to 204 each that include an optical semiconductor device. Each light-transmitting member has a peak transmission wavelength that corresponds to the wavelength of light received by the light-transmitting member (the wavelength of red light for R). The optical semiconductor devices in the light-transmitting members 202 to 204 output signals at a level as a function of an intensity of light transmitted through each of the light-transmitting members 202 to 204. Each of the light-transmitting members 202 to 204 is a filter that transmits light of the corresponding color (e.g., red color for R). The optical semiconductor devices are, for example, photodiodes. The term "peak transmission wavelength" refers to a wavelength at which the transmittance of the filter is maximum. However, if each element can receive light of the corresponding color by itself, the light-transmitting members 202 and 204 are not used.

<Control>

Figure 3:
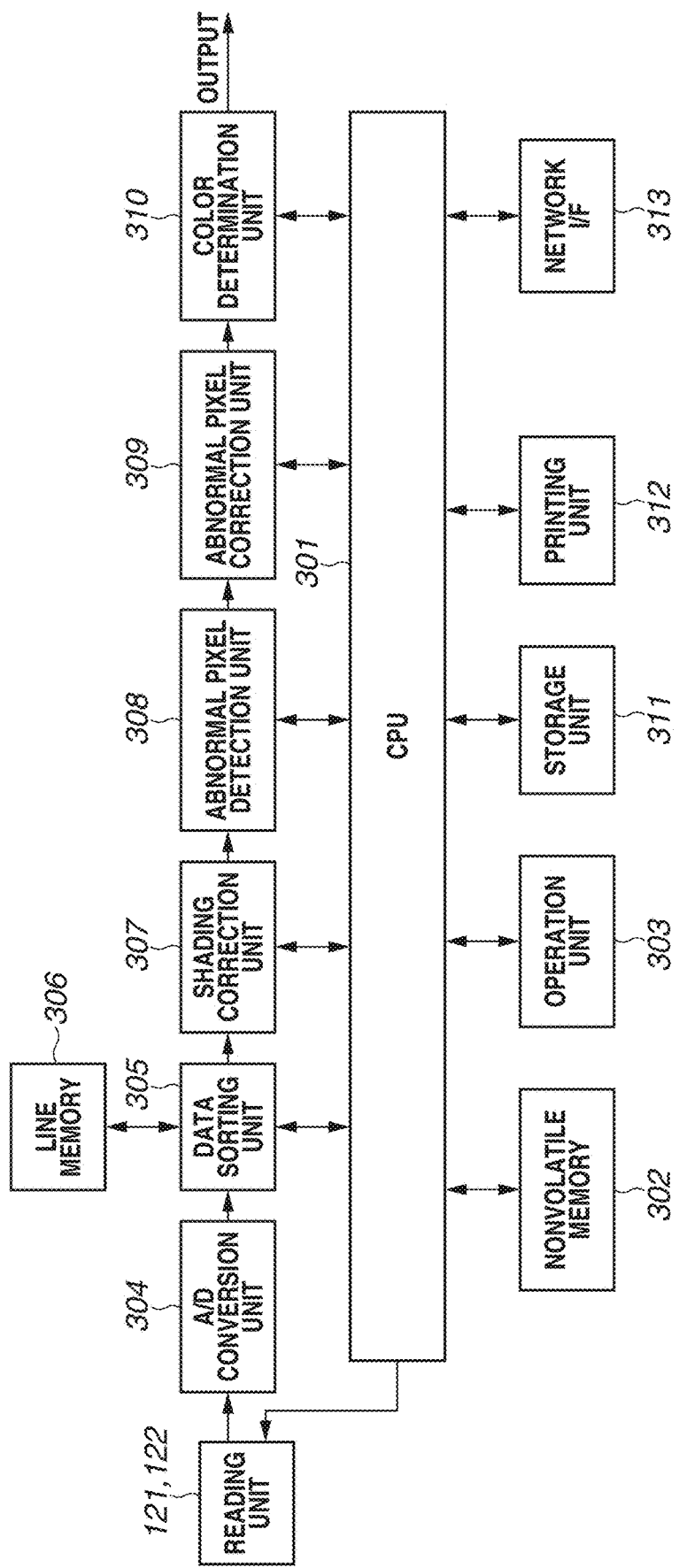
FIG. 3 is a block diagram illustrating a control unit according to the first exemplary embodiment.

FIG. 3 is a block diagram illustrating the configuration of an image processing apparatus including the automatic document feeding apparatus 100 and the image reading device 115 according to the first exemplary embodiment.

A control unit includes a central processing unit (CPU) 301, an analog-to-digital (A/D) conversion unit 304, a data sorting unit 305, a line memory 306, a shading correction unit 307, an abnormal pixel detection unit 308, an abnormal pixel correction unit 309, and a color determination unit 310. The control unit is connected to a nonvolatile memory 302, an operation unit 303, the front surface reading unit 121, the back surface reading unit 122, a storage unit 311, a printing unit 312, and a network interface (I/F) 313.

The CPU 301 controls operations of the automatic document feeding apparatus 100 and the image reading device 115 by executing control programs stored in the nonvolatile memory 302. The nonvolatile memory 302 is, for example, a read-only memory (ROM).

The operation unit 303 is a user interface for, for example, setting a double-sided reading mode for reading both sides of the individual sheets of the document 102, setting a resolution for reading, and setting a transmission destination of image data representing a read image. The settings input via the operation unit 303 are transmitted to the CPU 301 and are stored in the storage unit 311 such as a hard disk drive (HDD).

The A/D conversion unit 304 converts analog electric signals read by the front surface reading unit 121 and the back surface reading unit 122 into image data which constitutes digital signals.

The data sorting unit 305 rearranges the image data, which is generated from the document 102 that has been read, so that the pixels of a color are adjacent to one another.

The line memory 306 is a memory that stores the image data that is obtained through the conversion by the A/D conversion unit 304 and is rearranged by the data sorting unit 305.

The shading correction unit 307 performs shading correction processing that corrects unevenness in light quantity and the effect of differences in sensitivity between light-receiving elements, on the read data corresponding to each color of R, G, and B stored in the line memory 306. The shading correction processing uses shading coefficients obtained by reading a white reference plate (not illustrated).

The abnormal pixel detection unit 308 detects an abnormal pixel that is not present in any image on the sheets of the document 102, based on the results detected by the light-receiving elements that receive light of a color in different lines. In the present exemplary embodiment, an abnormal pixel is detected based on the state of the pixels rearranged by the data sorting unit 305. The abnormal pixel detection unit 308 will be described in detail below.

The abnormal pixel correction unit 309 performs abnormal pixel correction processing based on the image data and abnormal pixel information detected by the abnormal pixel detection unit 308. The abnormal pixel correction unit 309 will be described in detail below.

The color determination unit 310 performs processing for determining whether the image data generated by the abnormal pixel correction unit 309 indicates a color image or a black-and-white image. For example, input RGB image data is converted into (L, a, b) color space data and threshold processing is performed to thereby determine whether the image data indicates a color image or a black-and-white image. In the (L, a, b) color space, as the values a and b are closer to 0, the color are more perceived as black and white. The threshold processing is performed on abs (a) or abs (b), and if the value obtained as a result of threshold processing is lower than a threshold, it is determined that the image data indicates a black-and-white image. The expression "abs ( )" represents an absolute value here.

The image data on which the abnormal pixel correction processing is executed by the abnormal pixel correction unit 309 and the determination result obtained by the color determination unit 310 are stored in the storage unit 311.

After that, image processing based on the determination result obtained by the color determination unit 310 is executed on the image data stored in the storage unit 311, and the image data is printed by the printing unit 312. Alternatively, image processing based on the determination result obtained by the color determination unit 310 is executed on the image data stored in the storage unit 311, and the image data is transmitted to a destination designated by the operation unit 303 through the network I/F 313.

<Abnormal Pixel Detection Unit>

Figure 4:
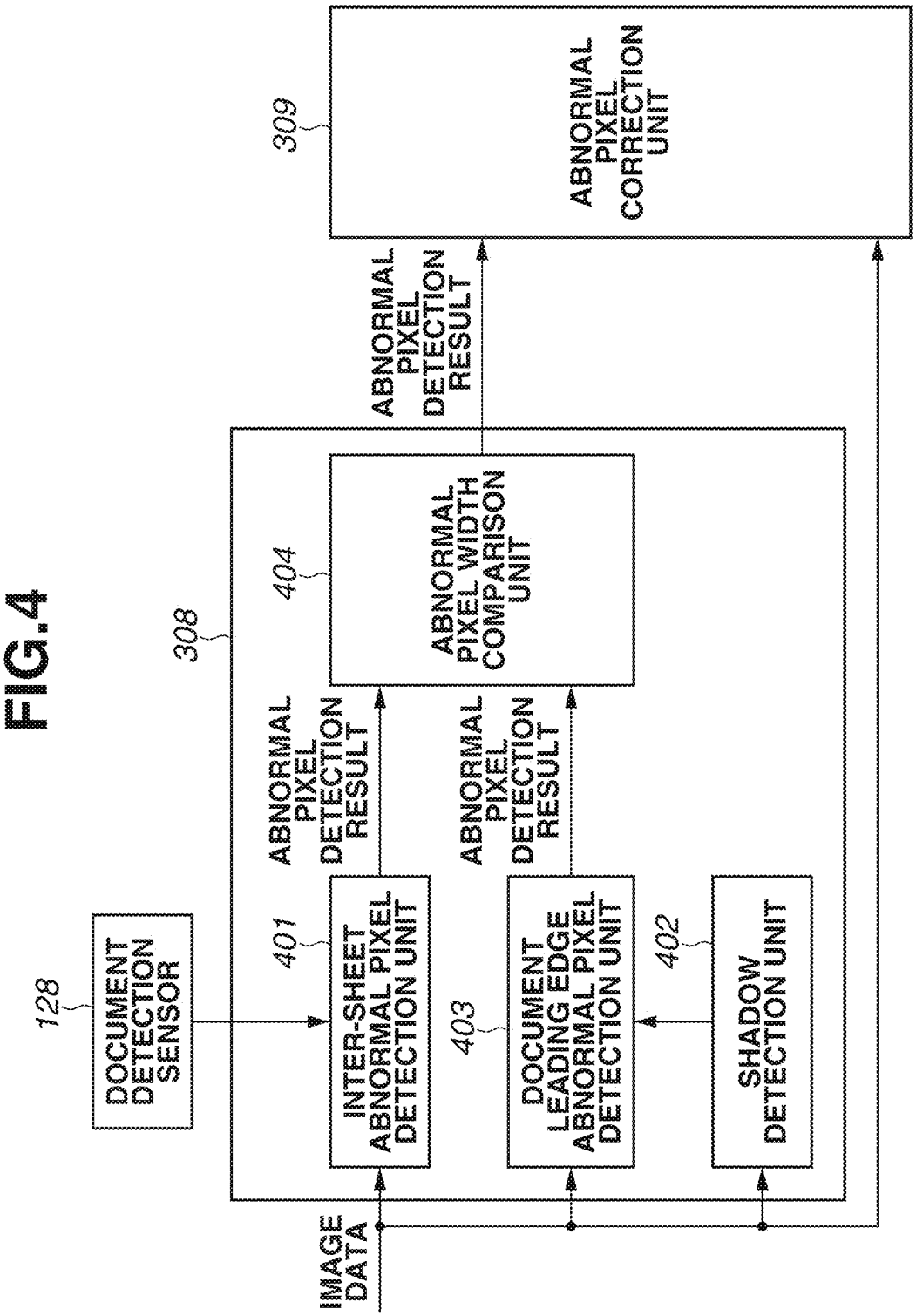
FIG. 4 is a block diagram illustrating an abnormal pixel detection unit according to the first exemplary embodiment.

FIG. 4 is a block diagram illustrating the abnormal pixel detection unit 308 according to the first exemplary embodiment.

The abnormal pixel detection unit 308 includes a document detection sensor 128, an inter-sheet abnormal pixel detection unit 401, a shadow detection unit 402, and a document leading edge abnormal pixel detection unit 403.

The inter-sheet abnormal pixel detection unit 401 detects abnormal pixel candidates based on image data when any surface of a sheet of the document 102 is not at a reading position. Specifically, the inter-sheet abnormal pixel detection unit 401 detects abnormal pixel candidates from a result (image data) obtained by the white platen roller 110 being read in an inter-sheet area. An abnormal pixel candidate is a pixel with a luminance value that is lower than or equal to a predetermined luminance value (pixels of colors closer to black). The term "inter-sheet area" refers to a gap between a sheet of the document conveyed along a conveyance path and the next sheet of the document subsequently conveyed.

Abnormal pixel candidates detected by the inter-sheet abnormal pixel detection unit 401 probably are caused by, for example, dust particles present on the platen roller 110, or dust particles present on the scan glass 116. Dust particles are foreign matter such as paper dust or dust.

The shadow detection unit 402 detects a shadow generated at the leading edge of a sheet of the document 102 based on input image data to detect the leading edge of the sheet of the document 102 (the leading edge area of a sheet of the document). The shadow detection unit 402 outputs a detection result as leading edge information about the sheet of the document 102.

The document leading edge abnormal pixel detection unit 403 detects abnormal pixel candidates based on the information about the leading edge of the sheet of the document 102 output from the shadow detection unit 402. Specifically, the document leading edge abnormal pixel detection unit 403 detects abnormal pixel candidates from the result obtained by the sheet of the document 102 being read immediately after the leading edge of the sheet of the document 102 has passed through the reading position, i.e., the image data on the leading edge area of the document 102. For example, typically, image information, such as characters or figures, is often provided in the center of a sheet of a document. As a result, it is difficult to detect abnormal pixel candidates generated due to dust particles or other foreign matter from image data obtained by the area in the center and the surrounding of the center of a document being read. In the image reading apparatus according to the present exemplary embodiment, abnormal pixel candidates therefore are detected in the leading edge areas of the individual sheets of the document 102 where a small number of pieces of image information are provided. From the above, abnormal pixel candidates detected by the document leading edge abnormal pixel detection unit 403 are highly likely to be due to dust particles present on the scan glass 116.

Figure 8A:
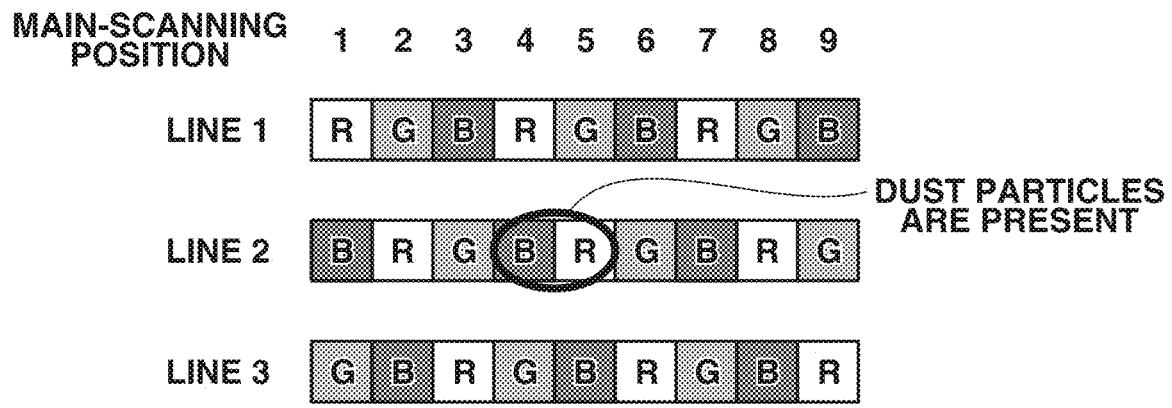
FIGS. 8A to 8C each illustrate an example of dust particles present on the line sensor according to the first exemplary embodiment.
Figure 8B:
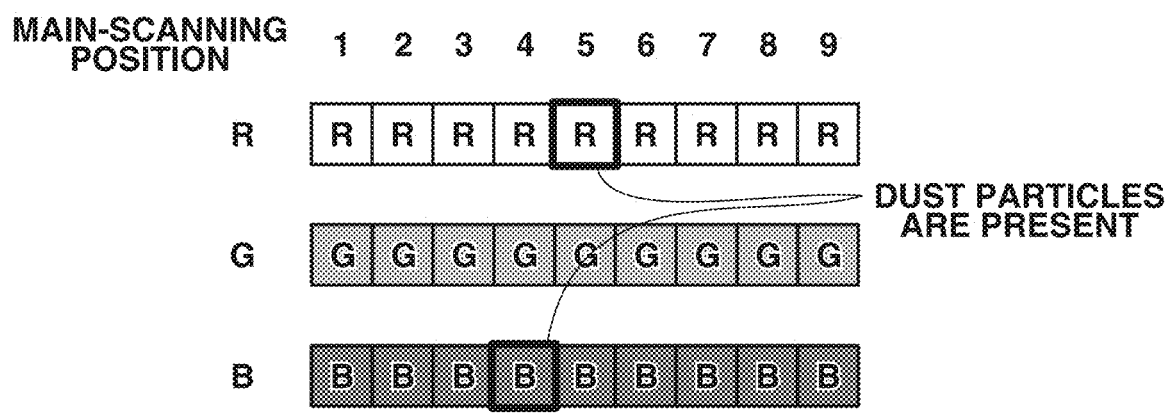
Figure 8C:
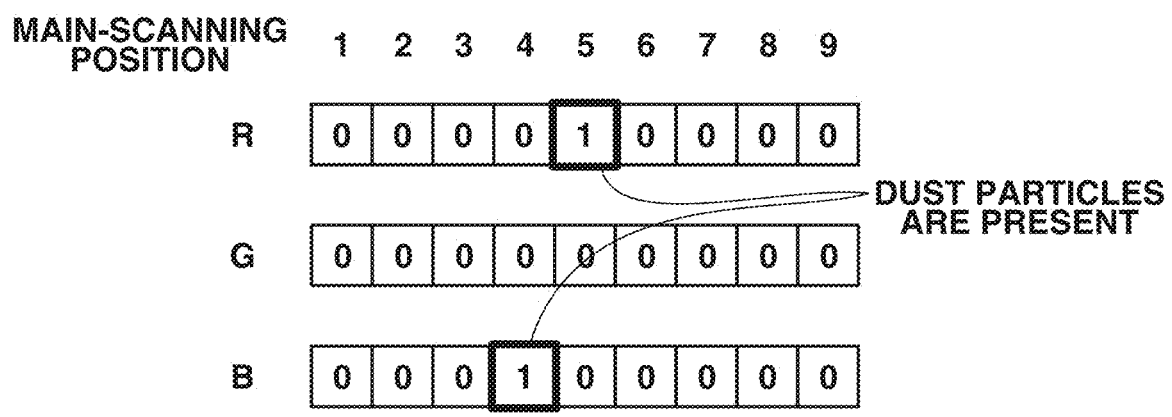

FIGS. 8A to 8C each illustrate a case where dust particles are present on the scan glass 116 over the line sensor illustrated in FIG. 2. In this case, main-scanning positions 1 to 9 of the line sensor are illustrated.

FIG. 8A illustrates a case where dust particles are present at the main-scanning positions 4 and 5, which are line sensor positions in the line 2. In FIG. 8A, dust particles are present at B-pixel and R-pixel positions. FIG. 8B illustrates the result obtained by the pieces of image data read in the condition illustrated in FIG. 8A being rearranged by color by the data sorting unit 305. In the image data read by the line sensor, the width of the abnormal pixels is a two-pixel width. In the image data rearranged into the line data of the respective colors, each abnormal pixel has a one-pixel width.

An abnormal pixel width comparison unit 404 determines positions of abnormal pixels based on a result obtained by abnormal pixel candidates being detected by the inter-sheet abnormal pixel detection unit 401 and a result obtained by abnormal pixel candidates being detected by the document leading edge abnormal pixel detection unit 403. The abnormal pixel width comparison unit 404 outputs "1" for an abnormal pixel position and "0" for a normal pixel position.

An abnormal pixel width determination unit (not illustrated) detects the width of an abnormal pixel of each color from the abnormal pixel detection result output from the abnormal pixel width comparison unit 404, and determines whether the detected width exceeds a predetermined threshold.

With a detected width of any color beyond the threshold, combining processing is performed on abnormal pixel detection results by color. In the combining processing with 1 as a result of abnormal pixel detection for any color, "1" is set to all the colors.

FIG. 8C illustrates an abnormal pixel detection result for the dust particles present as illustrated in FIG. 8A. In FIG. 8C, "1" indicates an abnormal pixel where a dust particle is present, and "0" indicates a normal pixel where no dust particle is present.

Abnormal pixel correction processing is performed based on the abnormal pixel information detected by the abnormal pixel detection unit 308 and the image data.

<Flowchart of Abnormal Pixel Detection Processing>

Figure 6:
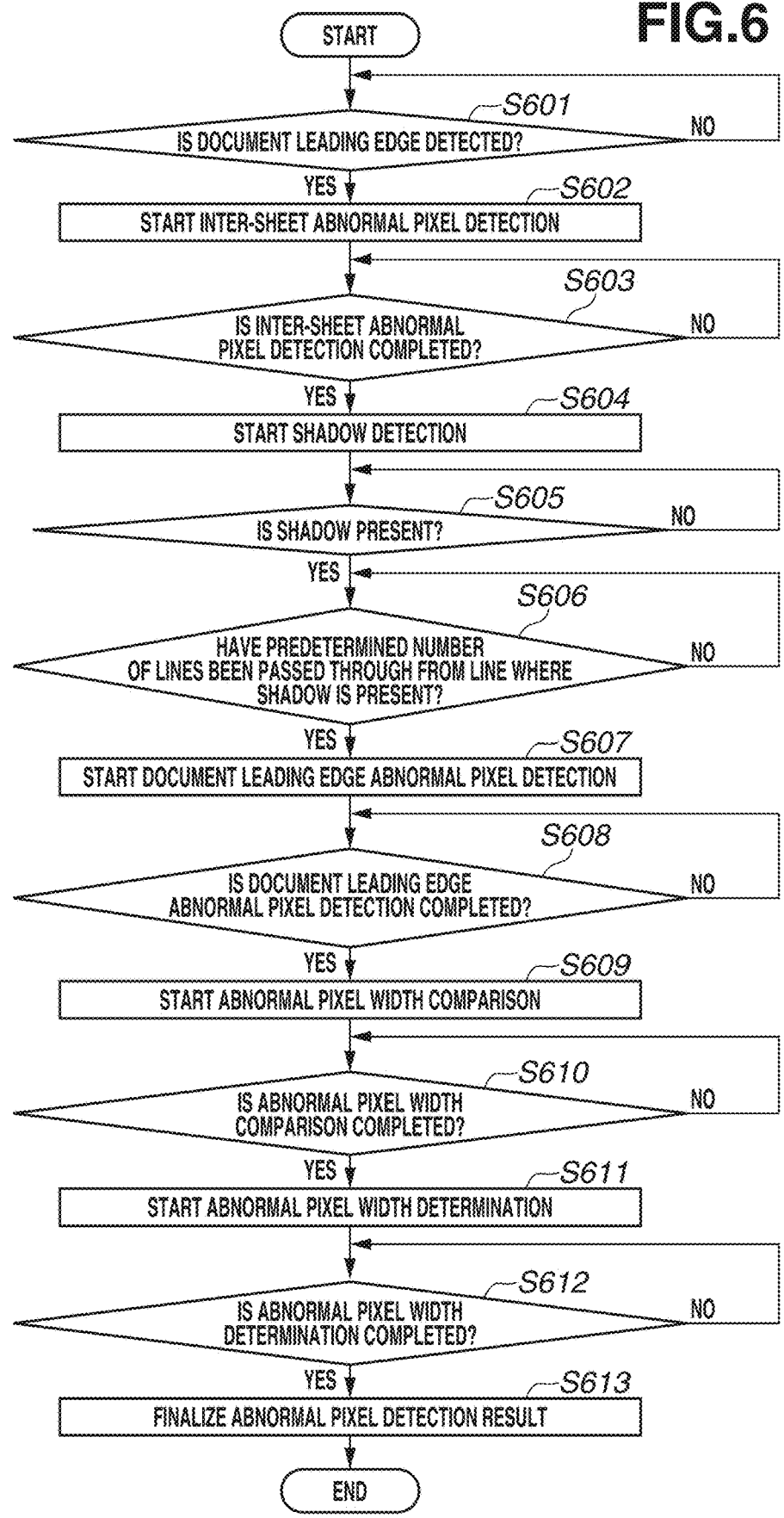
FIG. 6 is a flowchart illustrating a processing procedure of abnormal pixel detection processing according to the first exemplary embodiment.

FIG. 6 is a flowchart illustrating an example of a procedure for abnormal pixel detection processing to be performed by the image reading apparatus. The CPU 301 performs processing following this flowchart by running a program read from the nonvolatile memory 302.

In step S601, the CPU 301 determines whether a sheet of the document 102 has reached the position of the document detection sensor 128 based on a signal from the document detection sensor 128. If it is determined that the document 102 has reached the position of the document detection sensor 128 (YES in step S601), the processing proceeds to step S602. Otherwise, it is determined that the document leading edge is not detected (NO in step S601), and the processing of step S601 is repeatedly executed.

In step S602, the CPU 301 starts detection of abnormal pixel candidates (inter-sheet abnormal pixel detection) from image data via the inter-sheet abnormal pixel detection unit 401.

In step S603, the CPU 301 determines whether the detection of abnormal pixel candidates by the inter-sheet abnormal pixel detection unit 401 is complete. If it is determined that the detection of abnormal pixel candidates is complete (YES in step S603), the processing proceeds to step S604. If not (NO in step S603), the processing of step S603 is repeatedly executed.

In step S604, the CPU 301 starts shadow detection by the shadow detection unit 402.

In step S605, the CPU 301 determines whether a shadow is at the leading edge of the sheet of the document 102 based on the image data. If it is determined that a shadow is present (YES in step S605), the processing proceeds to step S606. Otherwise (NO in step S605), the processing of step S605 is repeatedly executed.

In step S606, the CPU 301 determines whether a predetermined number of lines have passed through from the line where the shadow is detected. If it is determined that the predetermined number of lines have passed through (YES in step S606), the processing proceeds to step S607. Otherwise (NO in step S606), the processing of step S606 is repeatedly executed.

In step S607, the CPU 301 starts document leading edge abnormal pixel detection by the document leading edge abnormal pixel detection unit 403. The shadow detection is performed at each main-scanning position. A skewed sheet of the document 102 causes the timing at which the shadow is detected to vary, and the timing when the processing of the document leading edge abnormal pixel detection 403 is started differs depending on the main-scanning position.

In step S608, the CPU 301 determines whether the document leading edge abnormal pixel detection by the document leading edge abnormal pixel detection 403 is complete. If it is determined that the document leading edge abnormal pixel detection is complete (YES in step S608), the processing proceeds to step S609. Otherwise (NO in step S608), the processing of step S608 is repeatedly executed.

In step S609, the CPU 301 starts abnormal pixel width comparison based on the output result from the inter-sheet abnormal pixel detection unit 401 and the output result from the document leading edge abnormal pixel detection unit 403 via the abnormal pixel width comparison unit 404.

In step S610, the CPU 301 determines whether the abnormal pixel width comparison by the abnormal pixel width comparison unit 404 is complete. If it is determined that the abnormal pixel width comparison is complete (YES in step S610), the processing proceeds to step S611. If not (NO in step S610), the processing of step S610 is repeatedly executed.

In step S611, the CPU 301 starts abnormal pixel width determination by color with respect to the output result from the abnormal pixel width comparison unit 404 via the abnormal pixel width determination unit.

In step S612, the CPU 301 determines whether the abnormal pixel width determination by the abnormal pixel width determination unit is complete. If it is determined that the abnormal pixel width determination is complete (YES in step S612), the processing proceeds to step S613. Otherwise (NO in step S612), the processing of step S612 is repeatedly executed.

In step S613, the CPU 301 finalizes the abnormal pixel detection result, and then terminates the processing.

Next, the abnormal pixel correction processing will be described.

Figure 9B:
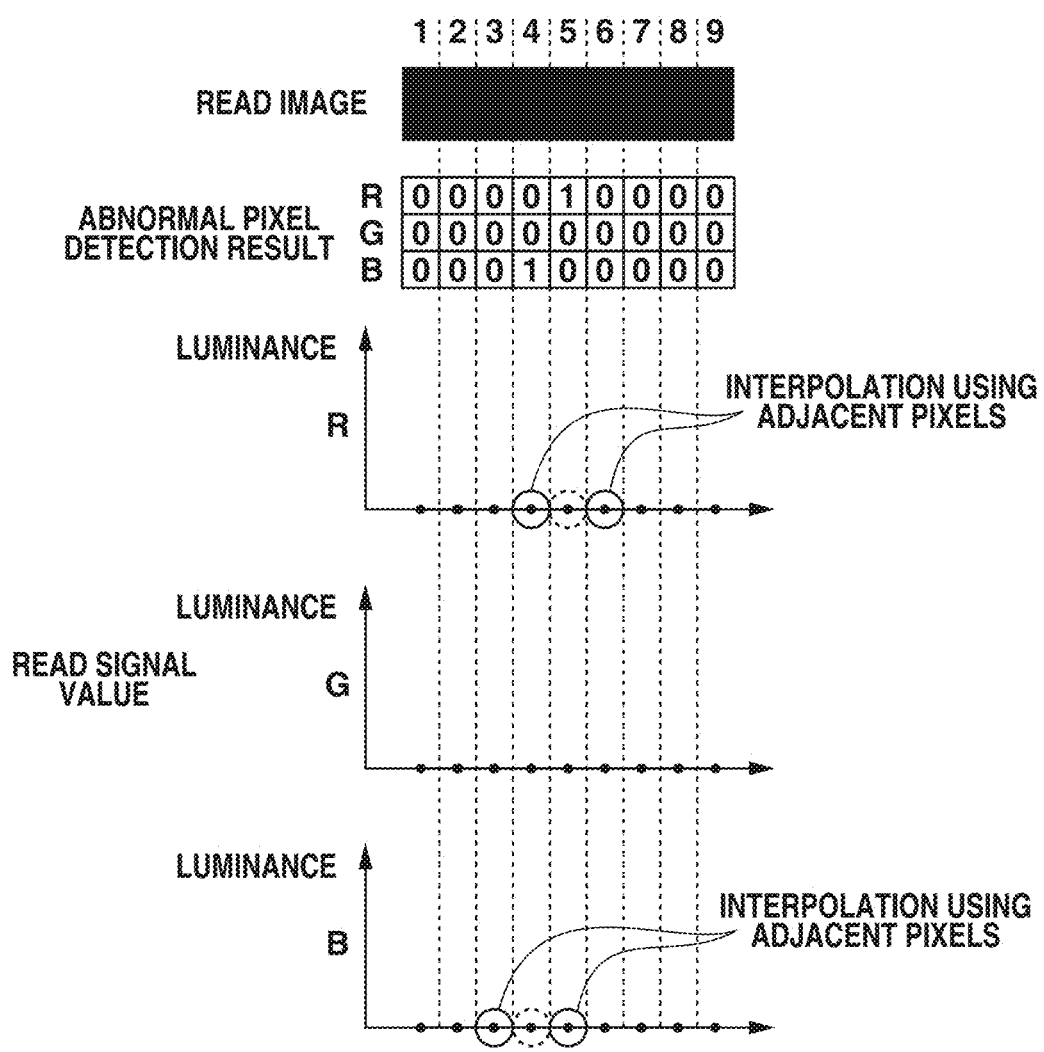

FIGS. 9A and 9B each illustrate an example of interpolation processing when the sheet of the document 102 is read with dust particles present as illustrated in FIG. 8A, at all the main-scanning positions 1 to 9 of which are all covered with an black image. In this example, abnormal pixel flags are generated for the B-pixel located at the main-scanning position 4 and the R-pixel located at the main-scanning position 5. As illustrated in FIG. 9A, normal values of reading signal values at the main-scanning positions are indefinite. The term "indefinite" means a pixel for which a reading signal value illustrated in FIG. 9A is not plotted. Linear interpolation processing based on adjacent pixels is performed on the pixels for which reading signal values are indefinite based on the abnormal pixel detection result.

FIG. 9B illustrates results obtained by pixel values being calculated by linear interpolation processing. The adjacent pixels have a luminance value of 0, and thus the pixel values calculated by interpolation processing also are 0.

Figure 10A:
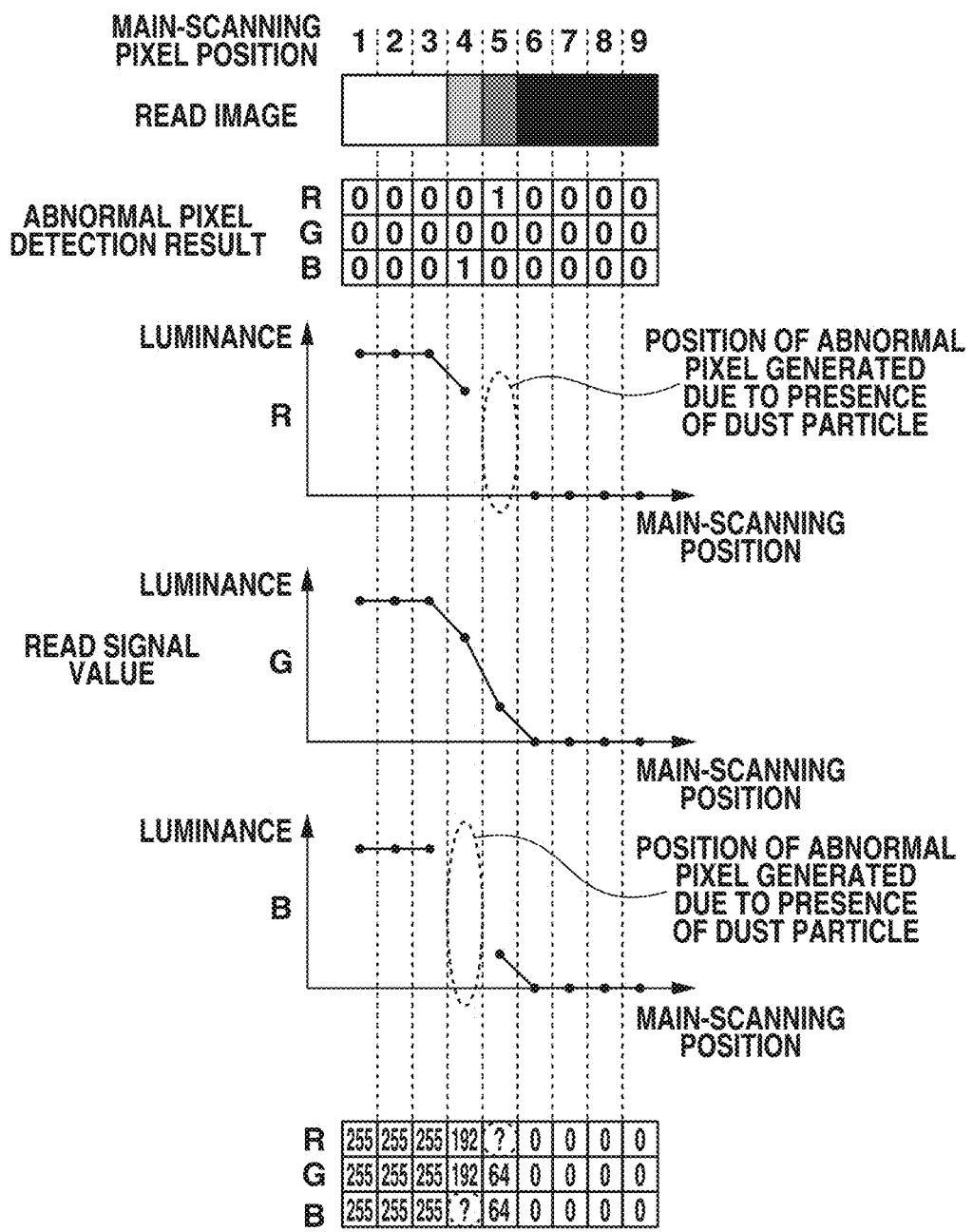
FIGS. 10A and 10B each illustrate an example of correction processing according to the first exemplary embodiment.
Figure 10B:
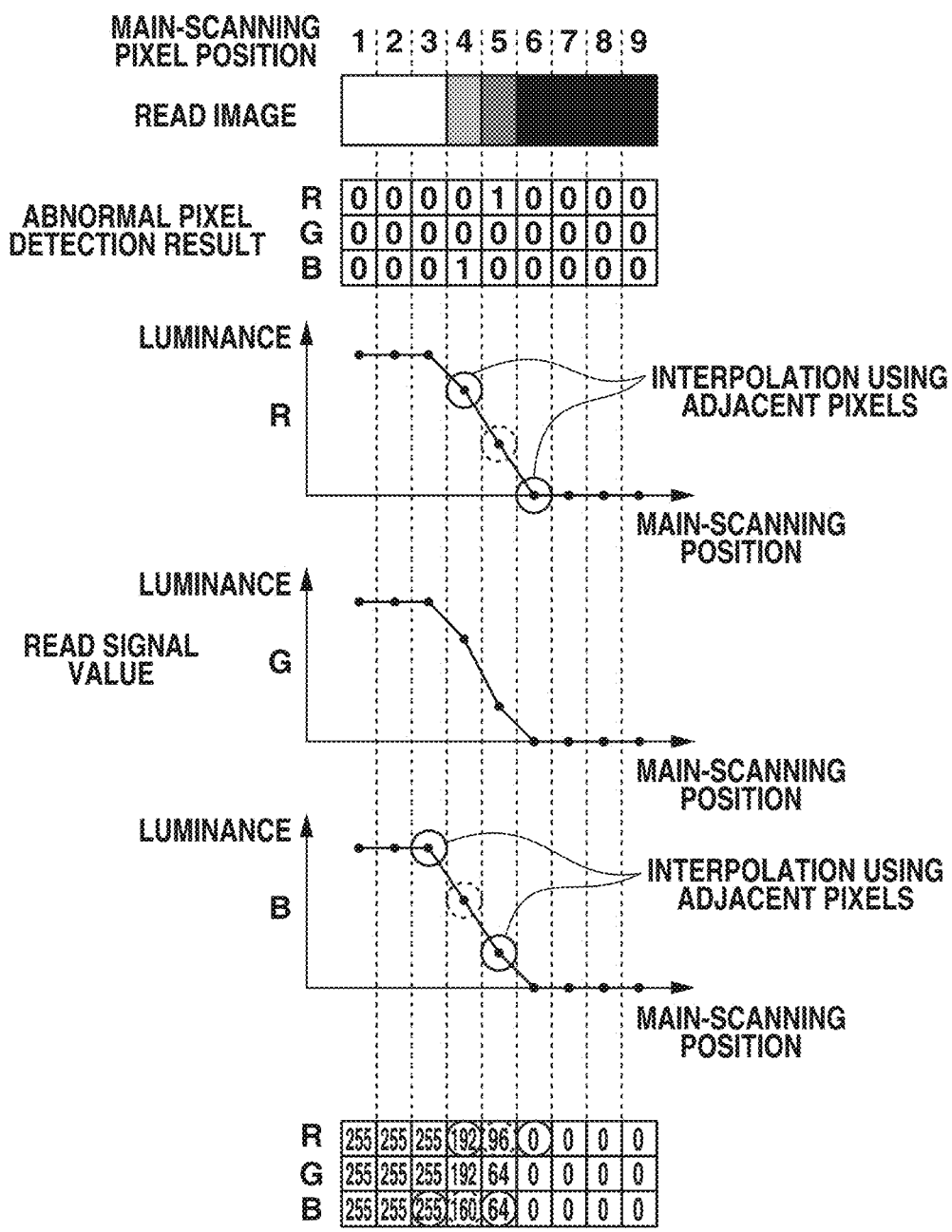

FIGS. 10A and 10B each illustrate an example of interpolation processing when a sheet of the document 102 is read with dust particles present as illustrated in FIG. 8A, the image on which has pixel values changed from white to black near the main-scanning positions 4 and 5. A portion in the vicinity of the boundary at which the color changes from white to black is referred to as an edge portion. Since the abnormal pixel flags are generated for the B-pixel located at the main-scanning position 4 and the R-pixel located at the main-scanning position 5, as illustrated in FIG. 10A, the normal values of reading signal values for the colors at the respective main-scanning positions are indefinite. Linear interpolation processing based on adjacent pixels therefore is performed based on the abnormal pixel detection result. FIG. 10B illustrates results obtained by pixel values being calculated by linear interpolation processing. In this case, the B-pixel is detected as an abnormal pixel at the main-scanning position 4, and thus linear interpolation is performed based on the B-pixels located at the main-scanning positions 3 and 5.

In this case, the B-pixel located at the main-scanning position 3 indicates 255 and the B-pixel located at the main-scanning position 5 indicates 64. Hence, the linear interpolation processing for the B-pixel results in (255×1+64×1)/2=160.

At the main-scanning position 5, the R-pixel is detected as an abnormal pixel. Linear interpolation therefore is performed based on the R-pixels located at the main-scanning positions 4 and 6.

In this case, the R-pixel located at the main-scanning position 4 indicates 192 and the R-pixel located at the main-scanning position 6 indicates 0. The linear interpolation processing for the R-pixel results in (192×1+0×1)/2=96.

As the results of interpolation processing, pixel values of the R-pixel, the G-pixel, and the B-pixel at the main-scanning position 4 are (192, 192, 160), and coloring occurs due to differences between the signal values of the R-pixel, the G-pixel, and the B-pixel.

In addition, the pixel values of the R-pixel, the G-pixel, and the B-pixel at the main-scanning position 5 are (96, 64, 64), and coloring occurs due to differences in the signal values of the R-pixel, the G-pixel, and the B-pixel also at the main-scanning position 5.

Due to the occurrence of coloring through the interpolation processing, the color determination unit 310 may erroneously determine the black-and-white image sheet of the document 102 to be a color image.

In the present exemplary embodiment, even if an abnormal pixel is generated due to a dust particle present at an black edge portion, abnormal pixel correction processing is performed to reduce the occurrence of coloring.

<Abnormal Pixel Correction Unit>

Figure 5:
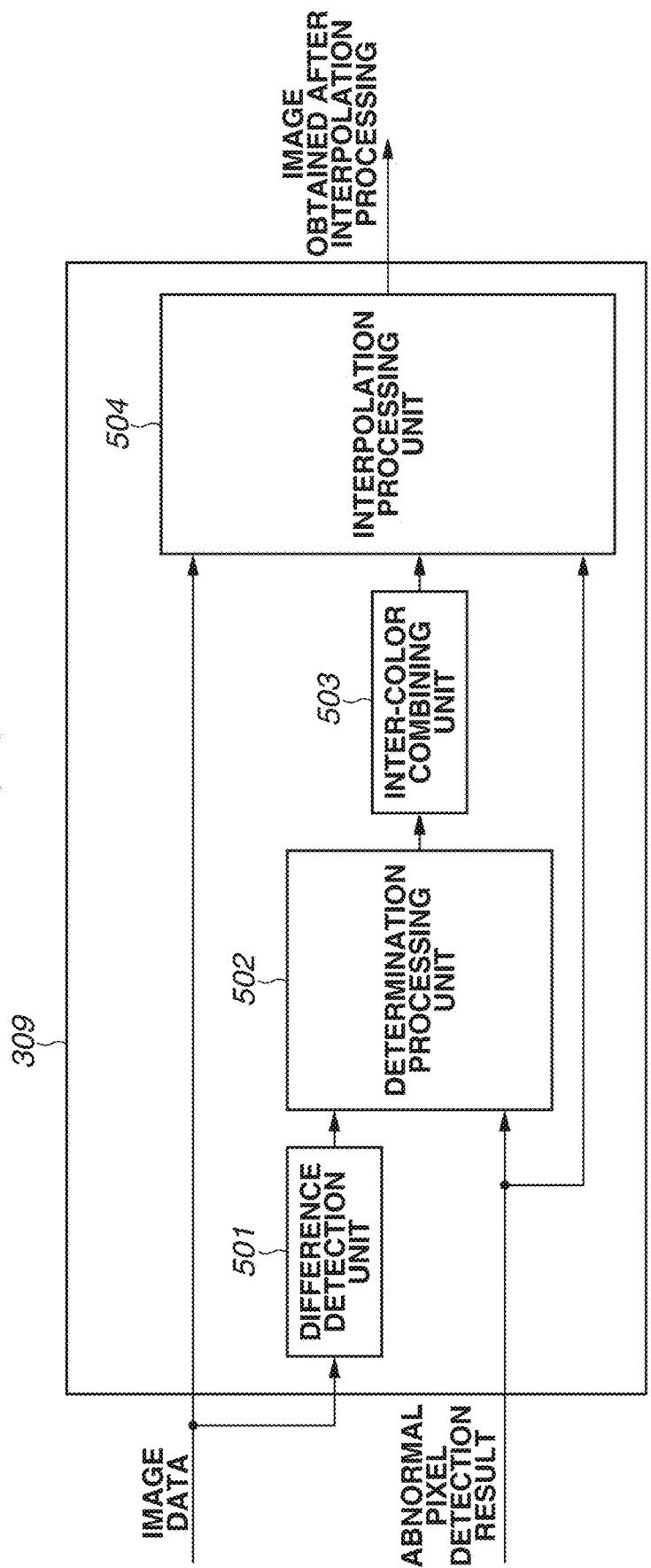
FIG. 5 is a block diagram illustrating an abnormal pixel correction unit according to the first exemplary embodiment.

FIG. 5 is a block diagram illustrating the abnormal pixel correction unit 309 according to the first exemplary embodiment.

Figure 14:
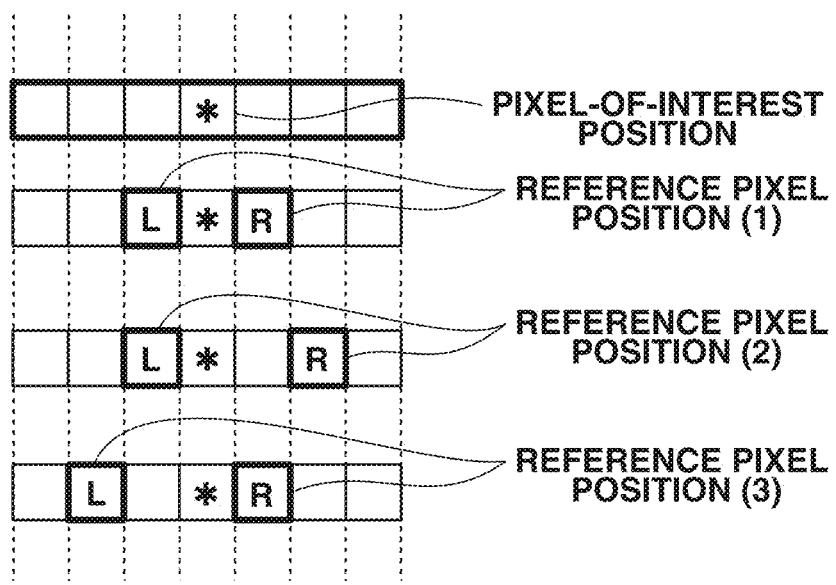
FIG. 14 illustrates an example of reference pixel positions for a difference detection unit according to the first exemplary embodiment.

A difference detection unit 501 detects whether there is a difference between signal values of pixels in the vicinity of a pixel-of-interest position by color of input image data. FIG. 14 illustrates an example of reference pixel positions for which the difference detection unit 501 detects whether there is a difference between signal values. The difference detection unit 501 sets a window with a predetermined size to reference adjacent pixels. In the present exemplary embodiment, an example will be illustrated where a window that forms a 7×1 arrangement is set, but the size of the window is not limited to this example. Reference pixel positions (1) illustrated in FIG. 14 are set on both sides of a pixel of interest. In this case, a difference between a signal value of a pixel L on the left of the pixel-of-interest position and a signal value of a pixel R on the right of the pixel-of-interest position is calculated. Specifically, diff=abs (pixel L−pixel R) is calculated. If the difference value diff exceeds a threshold, it is determined that there is a difference between signal values at the pixel-of-interest position. If the difference value diff is lower than or equal to the threshold, it is determined that there is no difference between signal values. As for reference pixel positions (2) and reference pixel positions (3), it is determined whether there is a difference between signal values at different pixel positions. In the present exemplary embodiment, although an example is illustrated where the three patterns of the reference pixel positions (1), (2), and (3) are set, reference pixel positions are not limited to this example. The difference detection unit 501 outputs information indicating whether there is a difference between signal values in each pattern of the set reference pixel positions.

A determination processing unit 502 generates a signal value difference flag for each color based on the difference detection result generated by the difference detection unit 501 and the abnormal pixel detection result generated by the abnormal pixel detection unit 308.

FIG. 18 illustrates patterns for pattern matching in a window forming a 7×1 arrangement based on the abnormal pixel detection result for each color generated by the abnormal pixel detection unit 308.

In this case, if the abnormal pixel detection result matches the pattern No. 1 illustrated in FIG. 18, a signal value difference flag generated by the difference detection unit 501 for the reference pixel positions (1) illustrated in FIG. 14 is output.

If the abnormal pixel detection result matches the pattern No. 2 illustrated in FIG. 18, a signal value difference flag generated by the difference detection unit 501 for the reference pixel positions (2) illustrated in FIG. 14 is output.

If the abnormal pixel detection result matches the pattern No. 3 illustrated in FIG. 18, a signal value difference flag generated by the difference detection unit 501 for the reference pixel positions (3) illustrated in FIG. 14 is output.

An inter-color combining unit 503 combines the signal value difference flags for each color generated by the determination processing unit 502.

In this case, letting diff_R, diff_G, and diff_B be the signal value difference flags, respectively, OR processing is performed on the signal value difference flags for all the colors.
diff_R=OR (diff_R, diff_G, diff_B)
diff_G=OR (diff_R, diff_G, diff_B)
diff_B=OR (diff_R, diff_G, diff_B)

This is because, if it is determined that there is a difference between signal values for at least one color, interpolation processing is performed on all the colors at the pixel-of-interest position.

<Flowchart of Abnormal Pixel Correction Processing>

Figure 7:
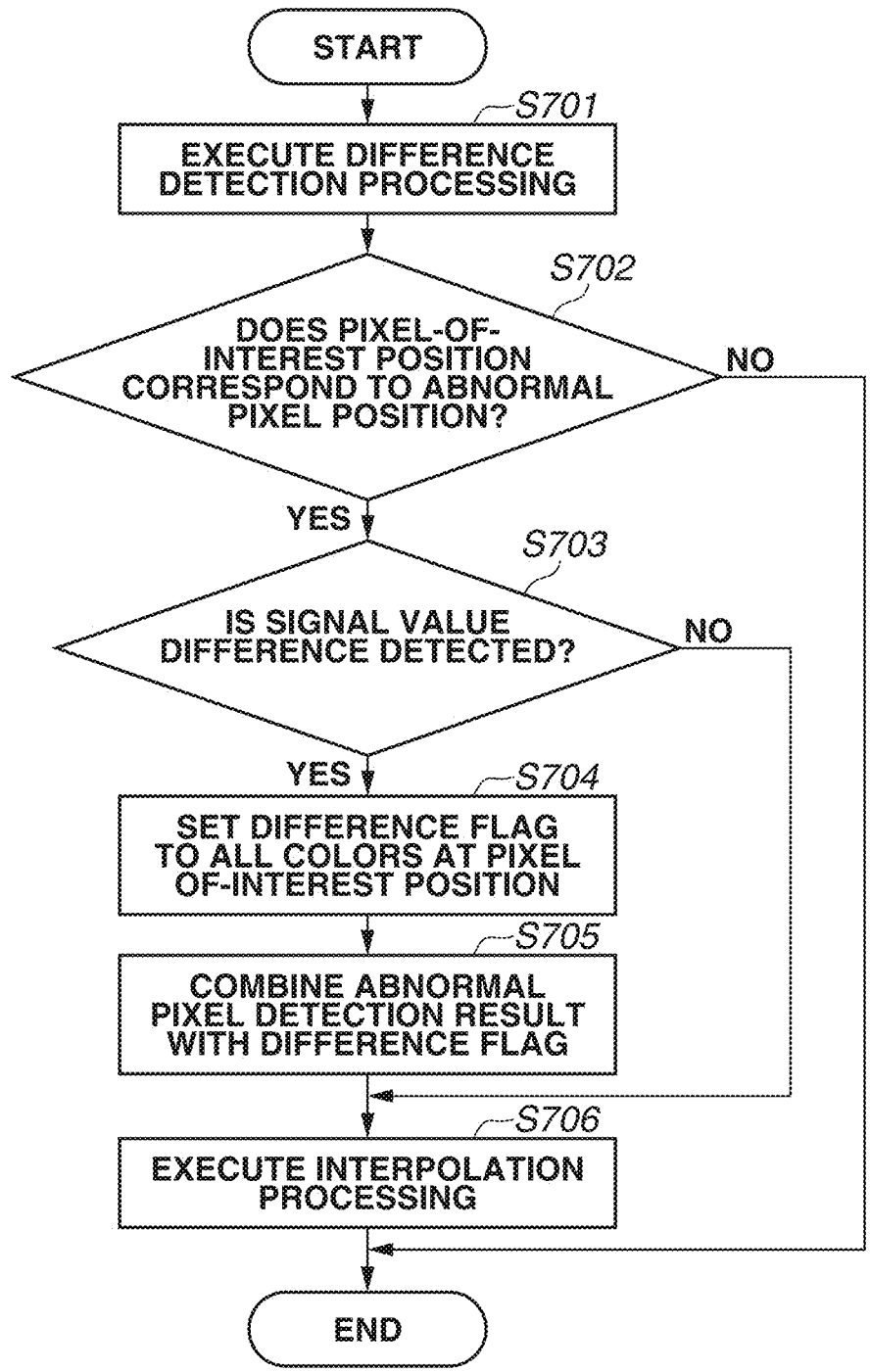
FIG. 7 is a flowchart illustrating a processing procedure operated by an abnormal pixel correction processing unit according to the first exemplary embodiment.

FIG. 7 is a flowchart illustrating an example of a procedure for abnormal pixel correction processing performed by the image processing apparatus. The CPU 301 performs processing following this flowchart by running a program read in the nonvolatile memory 302.

In step S701, the CPU 301 detects whether there is a difference between signal values by color from image data via the difference detection unit 501.

FIG. 11 illustrates a case where difference detection processing is performed using the reference pixel positions (1) to (3) illustrated in FIG. 14 on the B-pixel of the read image illustrated in FIGS. 10A and 10B.

In the pattern of the reference pixel positions (1), the difference value is abs (255−64)=191.

In the pattern of the reference pixel positions (2), the difference value is abs (255−0)=255.

In the pattern of the reference pixel positions (3), the difference value is abs (255−64)=191.

In this case, a threshold based on which it is determined that there is a difference between signal values may be set to, for example, 64. A threshold set here is a value that allows a difference between signal values to be detectable, the difference being at least at a level that causes an image with a coloring generated by the abnormal pixel correction processing to be determined to be a color image. As illustrated in FIG. 11, the difference values in all the patterns are higher than 64, thus it being determined that there is a difference between signal values (=1).

In step S702, the CPU 301 determines whether the pixel-of-interest position corresponds to an abnormal pixel position based on the abnormal pixel detection result output from the abnormal pixel detection unit 308 via the determination processing unit 502. If it is determined that the pixel-of-interest position corresponds to an abnormal pixel position (YES in step S702), the processing proceeds to step S703. If not (NO in step S702), the correction processing is not performed, and the processing therefore is terminated.

In step S703, the CPU 301 determines whether a difference between signal values is detected by the difference detection unit 501 via the determination processing unit 502.

In other words, it is determined whether the pixel-of-interest position corresponds to an edge portion of the image. If it is determined that there is a difference between signal values (the pixel-of-interest position corresponds to an edge portion of the image) (YES in step S703), the processing proceeds to step S704. If it is determined that there is no difference between signal values (the pixel-of-interest position corresponds to a portion other than an edge portion of the image) (NO in step S703), the processing proceeds to step S706.

In step S704, the CPU 301 sets a difference flag to each of the colors at the pixel-of-interest position via the inter-color combining unit 503. In this case, if there is at least one color for which it is determined that the pixel-of-interest position corresponds to an abnormal pixel position and for which there is a difference between signal values at the pixel-of-interest position, a difference flag is set to each of all the colors (R, G, and B colors) at the pixel-of-interest position.

In step S705, the CPU 301 combines the output result from the abnormal pixel detection unit 308 and the difference flags at the pixel-of-interest position via the interpolation processing unit 504, and generates a final abnormal pixel flag.

In step S706, the CPU 301 performs interpolation processing based on the final abnormal pixel flags generated in step S706.

In step S703, if it is determined that there is no difference between signal values (the pixel-of-interest position corresponds to a portion other than an edge portion of the image) (NO in step S703), steps S704 and S705 are skipped. A difference flag therefore is not set to any colors at the pixel-of-interest position. As illustrated in FIGS. 8A to 8C, an abnormal pixel flag is set to a pixel of a color for which the signal value is indefinite due to a dust particle, among a plurality of colors at the pixel-of-interest position, and an abnormal pixel flag is not set to any pixel of the other colors. Thus, in step S706, interpolation processing is performed for the corresponding pixel of the color in which the signal value is indefinite due to a dust particle, among the plurality of colors at the pixel-of-interest position, not performed on the pixels corresponding to the other colors.

Figure 12A:
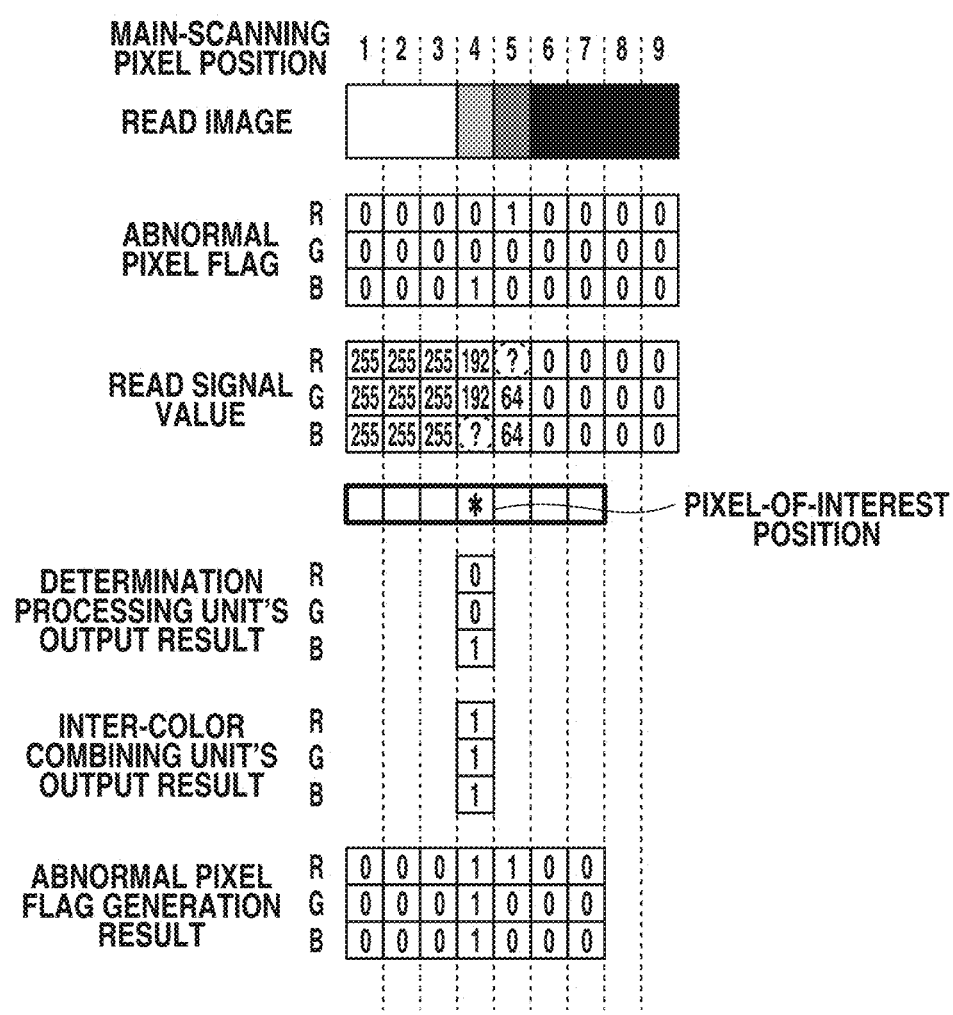
FIGS. 12A and 12B each illustrate an example of abnormal pixel flag generation processing using differences between signal values according to the first exemplary embodiment.
Figure 12B:
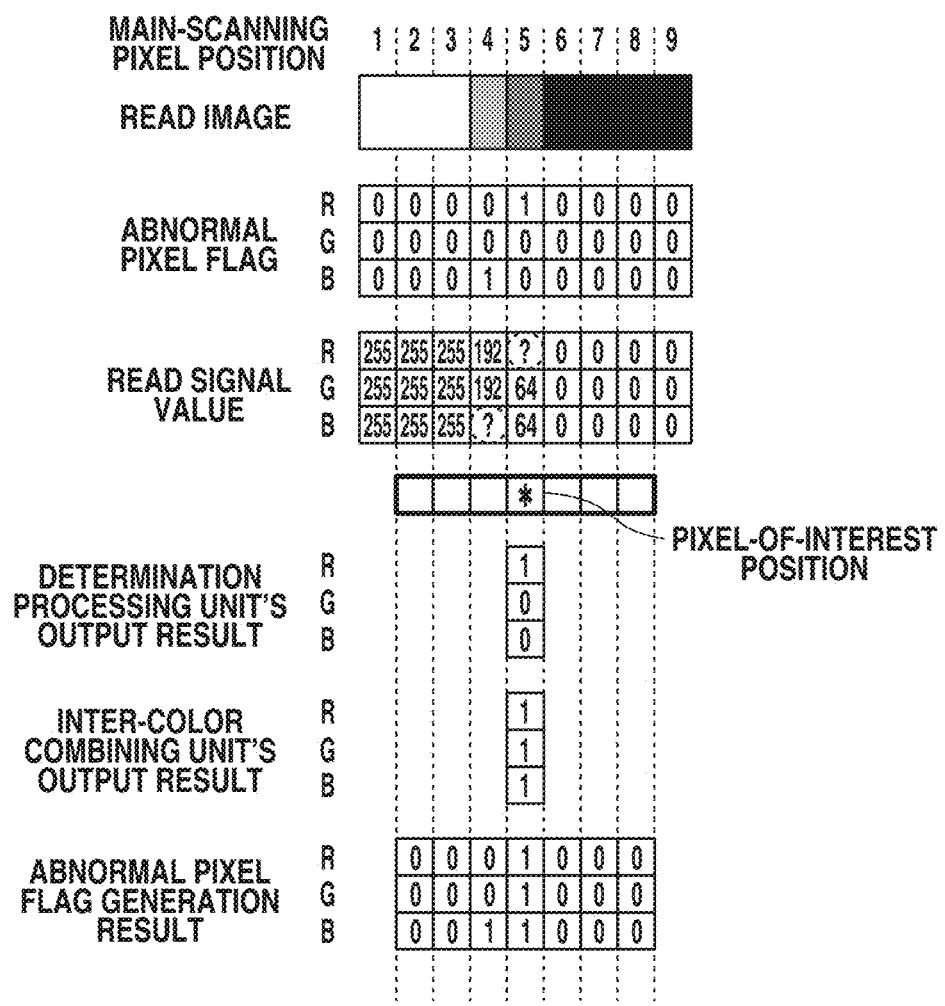

FIGS. 12A and 12B each illustrate the difference flag generated by the determination processing unit 502 and the inter-color combining unit 503 and the abnormal pixel flags generated by the interpolation processing unit 504 in the read image illustrated in FIGS. 10A and 10B.

FIG. 12A illustrates a case where the main-scanning pixel position 4 is set as a pixel-of-interest position, and FIG. 12B illustrates a case where the main-scanning pixel position 5 is set as a pixel-of-interest position.

As illustrated in FIG. 12A, the determination processing unit 502 outputs the output result "1" indicating that the B-pixel corresponds to the abnormal pixel position and there is a difference between signal values.

The inter-color combining unit 503 performs OR processing on all the colors, and thus "1" is output for all the colors at the pixel-of-interest position.

The interpolation processing unit 504 combines the output result from the abnormal pixel detection unit 308 with the difference flag at the pixel-of-interest position, and generates the final abnormal pixel flags.

Figure 13A:
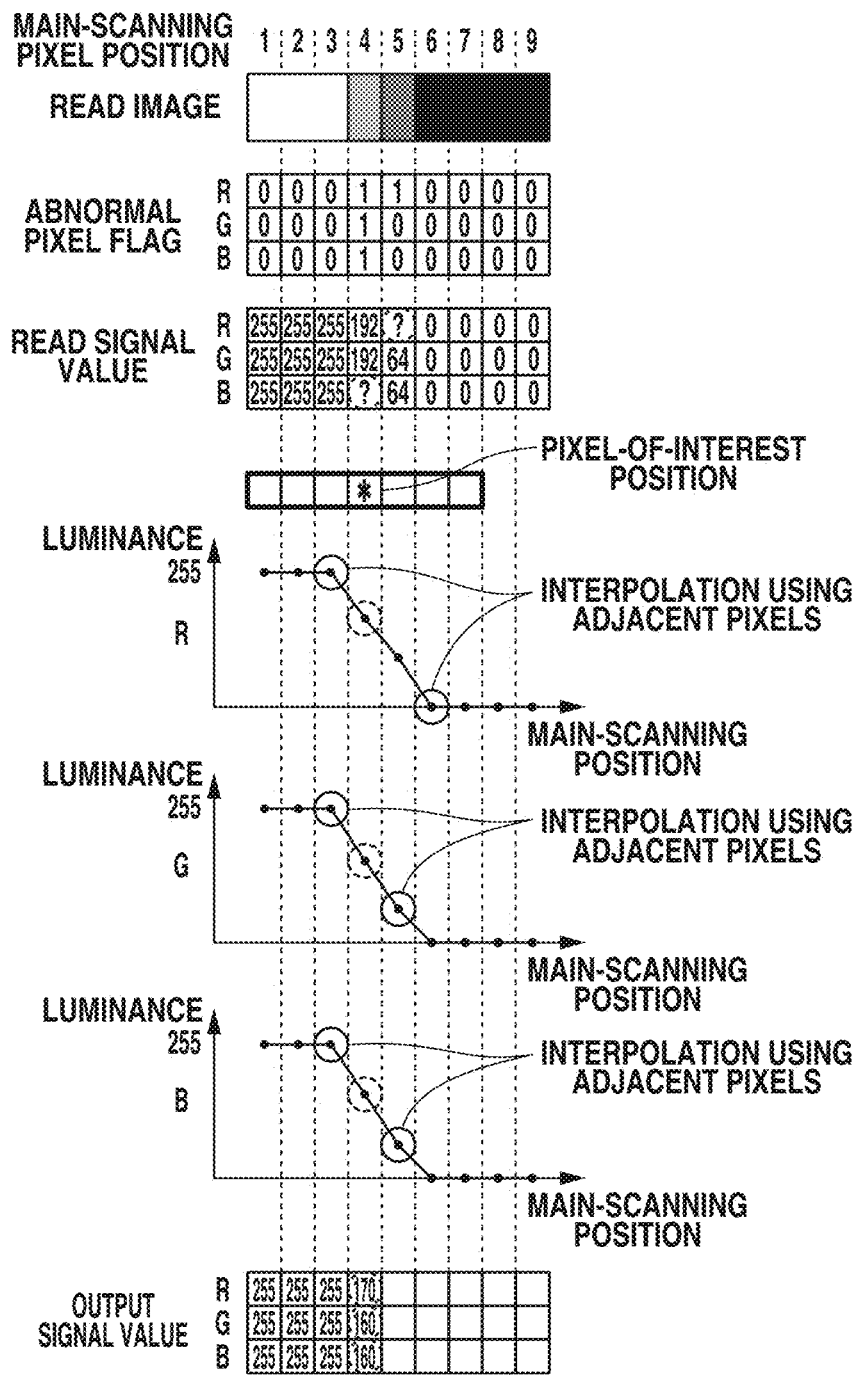
FIGS. 13A and 13B each illustrate an example of correction processing using differences between signal values according to the first exemplary embodiment.
Figure 13B:
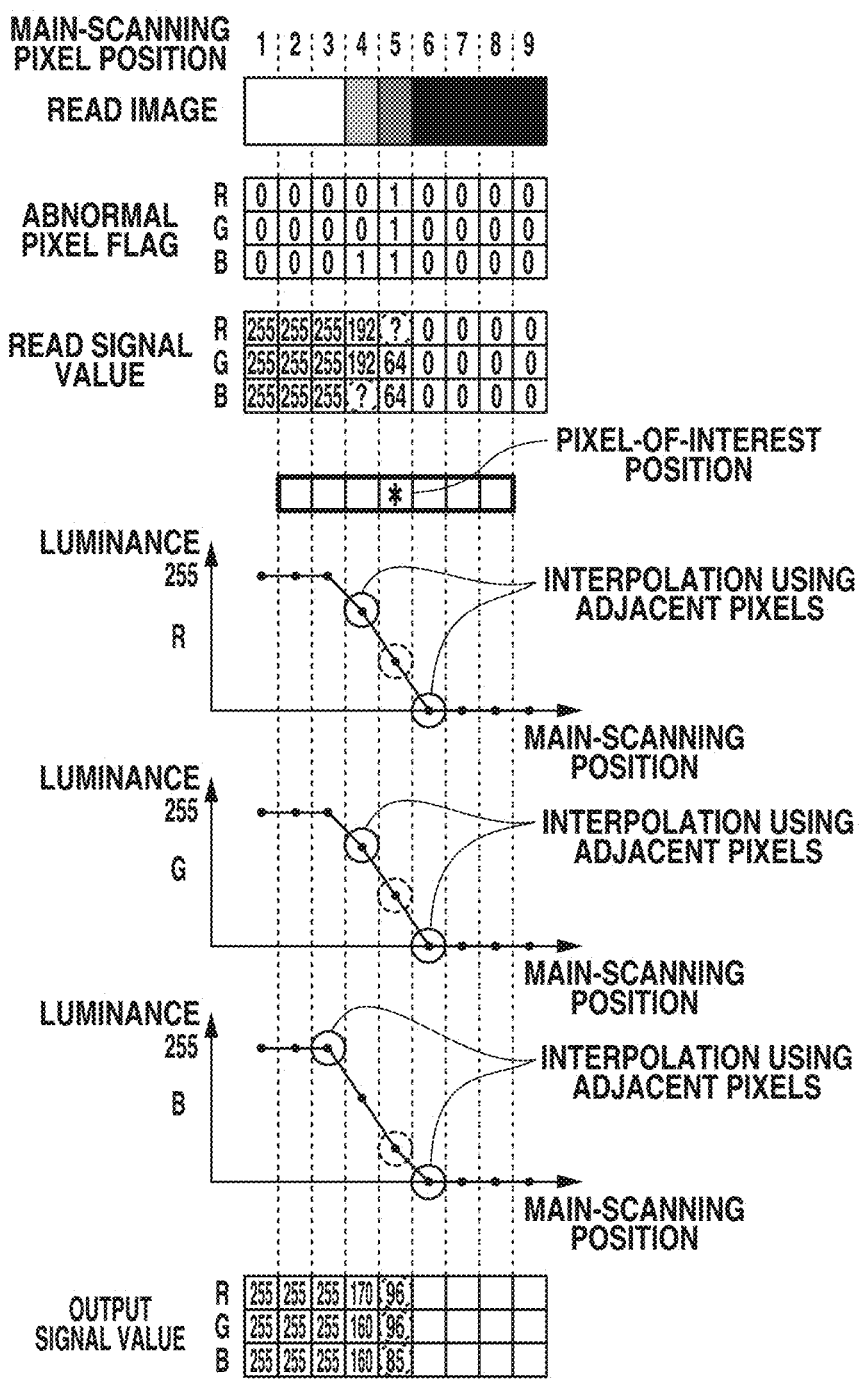

FIGS. 13A and 13B each illustrate corrected signal values where the interpolation processing unit 504 performs interpolation processing based on the final abnormal pixel flags. FIG. 13A illustrates interpolation processing where the main-scanning pixel position 4 corresponds to a pixel-of-interest position, and interpolation processing on R-pixels is performed based on values at the main-scanning pixel positions 3 and 6.

In this case, the R-pixel located at the main-scanning position 3 indicates 255 and the R-pixel located at the main-scanning position 6 indicates 0. Hence, when linear interpolation processing is performed, the interpolation processing result for the R-pixels is (255×2+0×1)/3=170.

Interpolation processing on G-pixels is performed based on values at the main-scanning pixel positions 3 and 5.

In this case, the G-pixel located at the main-scanning position 3 indicates 255 and the G-pixel located at the main-scanning position 5 indicates 64. Hence, when linear interpolation processing is performed, the interpolation processing result for the R-pixels is (255×1+64×1)/2=160.

Interpolation processing on B-pixels is performed based on values at the main-scanning pixel positions 3 and 5.

In this case, the B-pixel located at the main-scanning position 3 indicates 255 and the B-pixel located at the main-scanning position 5 indicates 64. Hence, when linear interpolation processing is performed, the interpolation processing result for the R-pixels is (255×1+64×1)/2=160.

FIG. 13B illustrates interpolation processing where the main-scanning pixel position 5 indicates a pixel-of-interest position. Interpolation processing on R-pixels is performed based on values at the main-scanning pixel positions 4 and 6.

In this case, the R-pixel located at the main-scanning position 4 indicates 192 and the R-pixel located at the main-scanning position 6 indicates 0. Hence, when linear interpolation processing is performed, the interpolation processing result for the R-pixels is (192×1+0×1)/2=96.

Interpolation processing on G-pixels is performed based on values at the main-scanning pixel positions 4 and 6.

In this case, the G-pixel located at the main-scanning position 5 indicates 255 and the G-pixel located at the main-scanning position 6 indicates 64. Hence, when linear interpolation processing is performed, the interpolation processing result for the R-pixels is (192×1+0×1)/2=96.

Interpolation processing on B-pixels is performed based on values at the main-scanning pixel positions 3 and 6.

In this case, the B-pixel located at the main-scanning position 3 indicates 255 and the B-pixel located at the main-scanning position 6 indicates 0. Hence, when linear interpolation processing is performed, the interpolation processing result for the R-pixels is (255×1+0×2)/3=85.

As the results of interpolation processing, the pixel values of the R-pixel, the G-pixel, and the B-pixel at the main-scanning position 4 are (170, 160, 160). The differences between the signal values of the R-pixel, the G-pixel, and the B-pixel are lower than the pixel values (192, 192, 160) obtained with no interpolation processing performed for any color in response to the determination of the differences between the signal values. This reduces the occurrence of coloring.

In addition, the pixel values of the R-pixel, the G-pixel, and the B-pixel at the main-scanning position 5 are (96, 96, 85). The differences between the signal values of the R-pixel, the G-pixel, and the B-pixel are lower than the pixel values (96, 64, 64) obtained with no interpolation processing performed for any color in response to the determination of the differences between the signal values. This reduces the occurrence of coloring.

As described above, according to the present exemplary embodiment, it is possible to provide the image reading apparatus capable of performing correction processing with the occurrence of coloring reduced and without making a correction mark noticeable, even if an abnormal pixel occurs due to a dust particle present at a black edge portion.

A second exemplary embodiment will now be described. In the first exemplary embodiment described above, a method is described that performs correction processing for all the colors at a pixel-of-interest position for differences between signal values of adjacent pixels when the pixel-of-interest position corresponds to an abnormal pixel position.

In the method according to the first exemplary embodiment, correction processing is performed based on whether the pixel-of-interest position corresponds to an abnormal pixel position and whether there are differences between signal values of adjacent pixels. As a result, positions of adjacent pixels referenced in the correction processing vary from color to color.

In the second exemplary embodiment, a method will be described that reduces the occurrence of coloring by correction processing at the positions of the adjacent pixels referenced in the correction processing, the positions of which are common to all the colors, when the pixel-of-interest position corresponds to an abnormal pixel position and there are differences between signal values of adjacent pixels.

Figure 15:
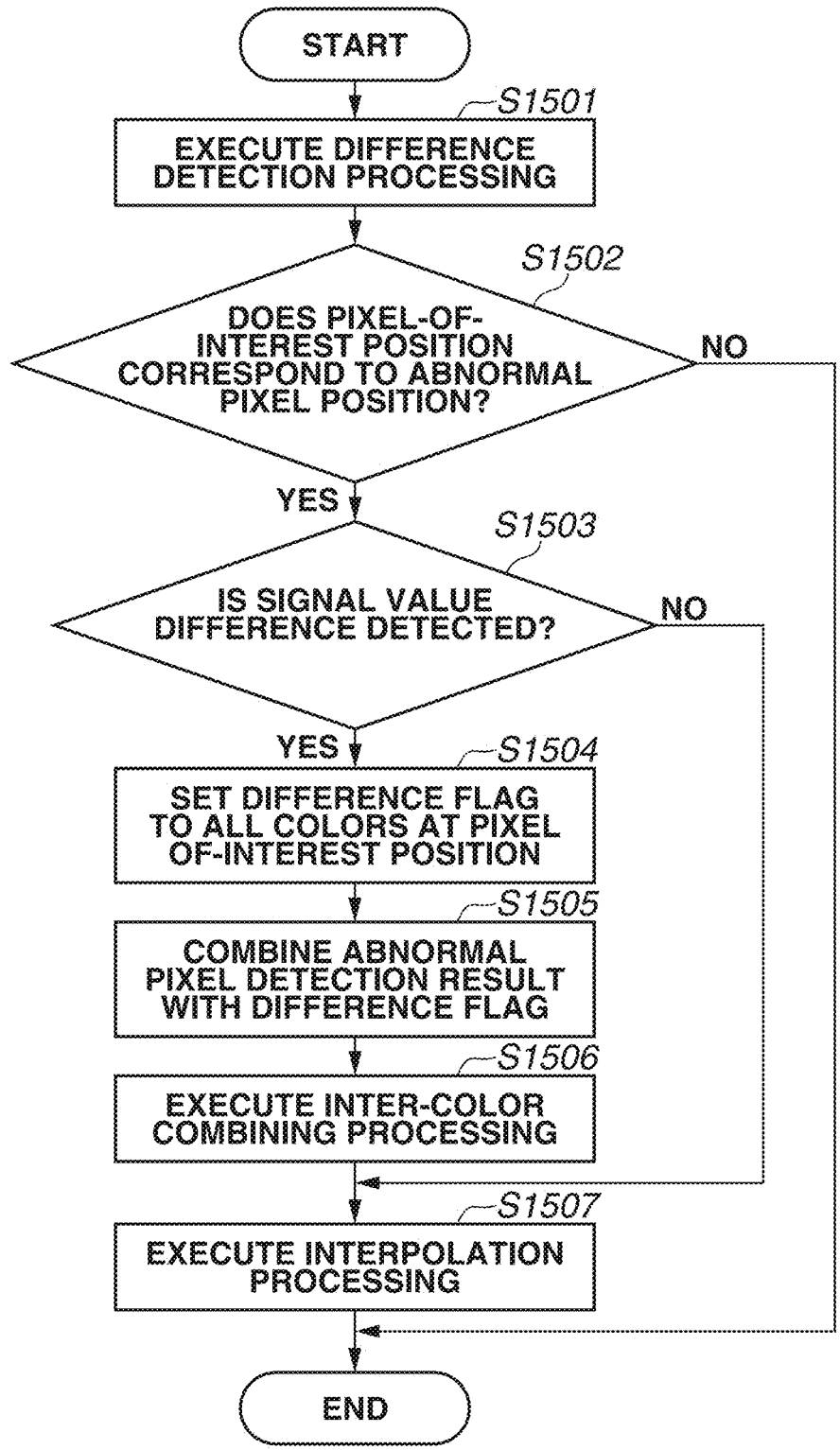
FIG. 15 is a flowchart illustrating a processing procedure executed by an abnormal pixel correction unit according to a second exemplary embodiment.

FIG. 15 is a flowchart illustrating an example of a procedure for abnormal pixel correction processing performed by the image reading apparatus according to the second exemplary embodiment. The CPU 301 performs processing following this flowchart by executing a program stored in the nonvolatile memory 302.

Steps S1501 to S1505 are respectively similar to steps S701 to S705 illustrated in FIG. 7, and thus the descriptions thereof are omitted.

In step S1506, the CPU 301 executes combining processing for all the colors on the abnormal pixel flag generation result generated in step S1505.

Figures 16A, 16B:
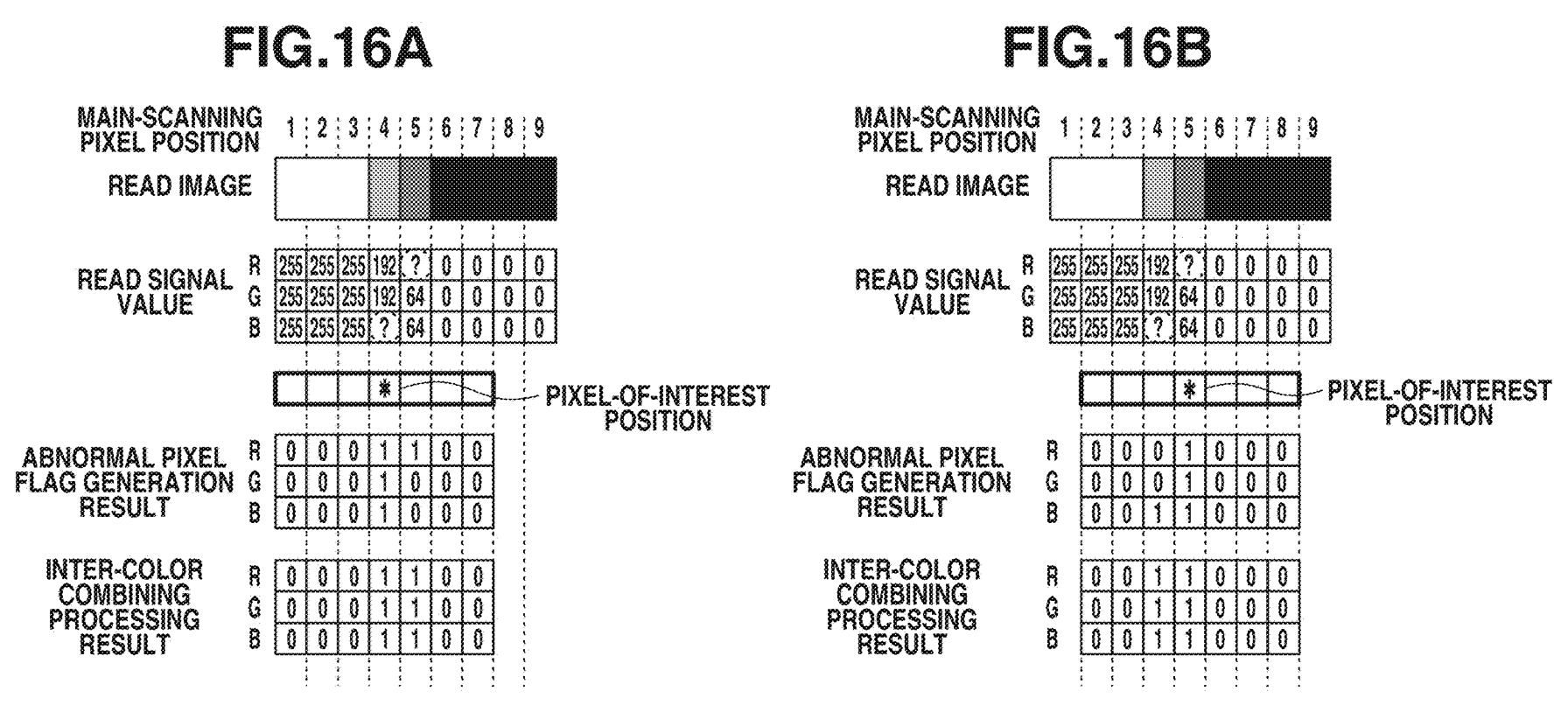

FIG. 16A illustrates the result obtained by inter-color combining processing being performed for all the colors on the abnormal pixel flag generation result generated in step S1505 when the main-scanning position 4 is set as a pixel-of-interest position. As the result of inter-color combining processing, abnormal pixel flags indicating 1 at the main-scanning positions 4 and 5 are generated.

In step S1507, the CPU 301 performs interpolation processing using the abnormal pixel flags generated in step S1506.

Figure 17A:
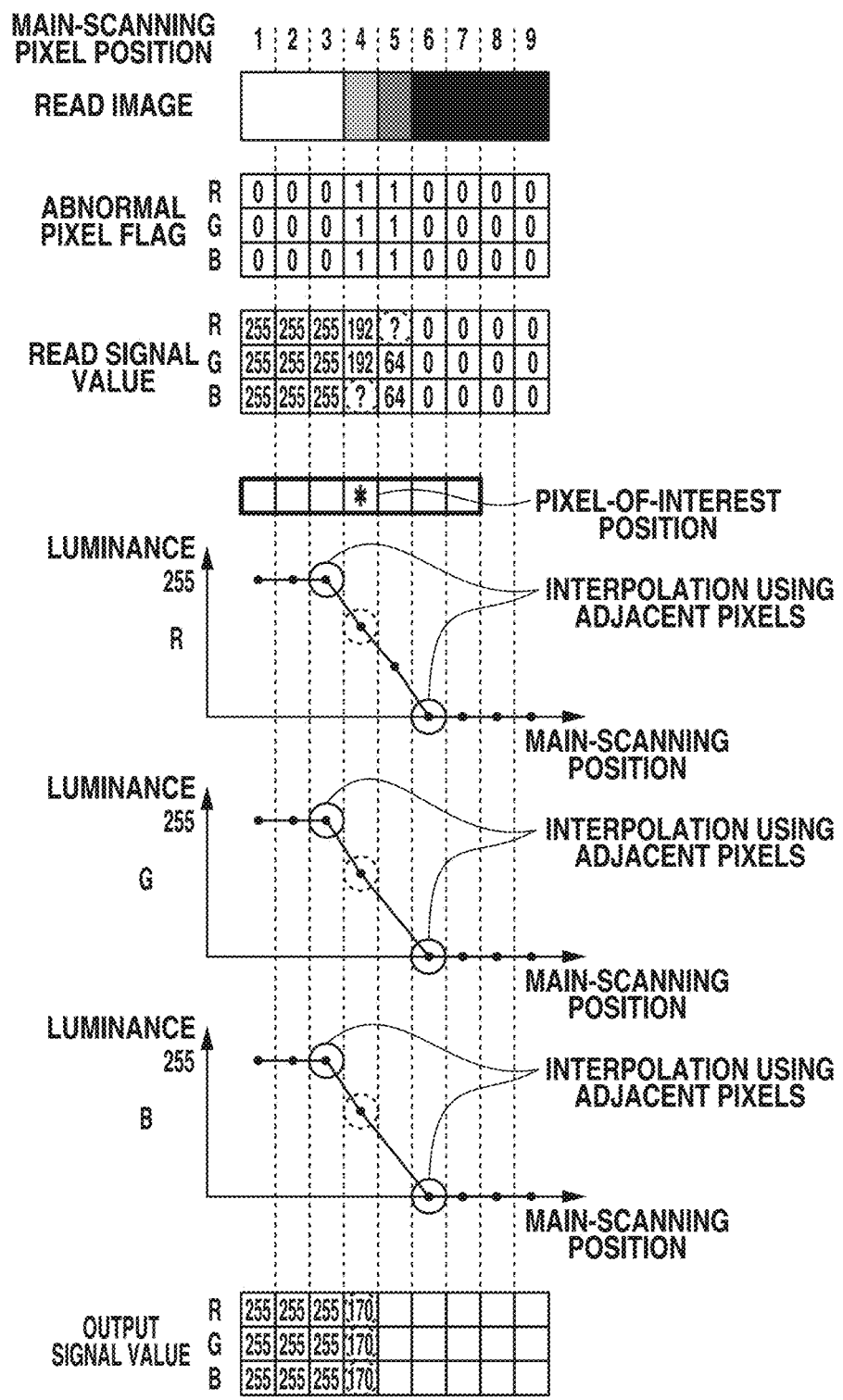
FIGS. 17A and 17B each illustrate an example of correction processing using differences between signal values according to the second exemplary embodiment.
Figure 17B:
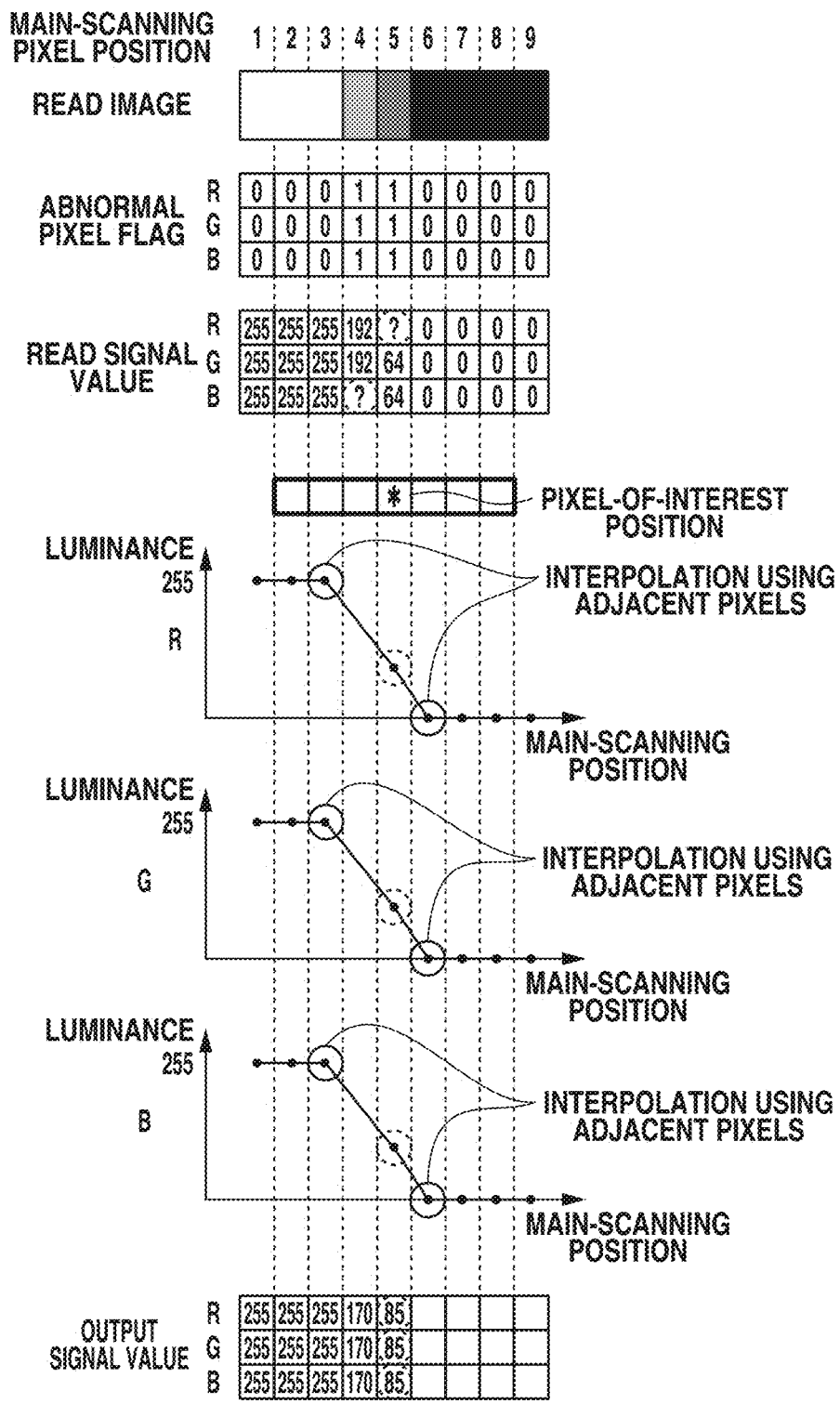

FIGS. 17A and 17B each illustrate corrected signal values where interpolation processing is performed by the interpolation processing unit 504 based on the final abnormal pixel flags. FIG. 17A illustrates interpolation processing when the main-scanning pixel position 4 corresponds to a pixel-of-interest position. Interpolation processing on each of the R-pixel, the G-pixel, and the B-pixel is performed based on the main-scanning positions 3 and 6.

In this case, the R-pixel located at the main-scanning position 3 indicates 255 and the R-pixel located at the main-scanning position 6 indicates 0. Hence, when linear interpolation processing is performed, the interpolation processing result for the R-pixels is (255×2+0×1)/3=170.

The interpolation processing result for each of the G-pixel and the B-pixel also indicates 170.

FIG. 17B illustrates interpolation processing when the main-scanning pixel position 5 corresponds to a pixel-of-interest position. Interpolation processing on each of the R-pixel, the G-pixel, the B-pixel is performed based on values at the main-scanning pixel positions 3 and 6.

In this case, the R-pixel located at the main-scanning position 3 indicates 255 and the R-pixel located at the main-scanning position 6 indicates 0. Hence, when linear interpolation processing is performed, the interpolation processing result for the R-pixels is (255×1+0×2)/3=85.

As the result of interpolation processing, the pixel values of the R-pixel, the G-pixel, and the B-pixel at the main-scanning position 4 are (170, 170, 170), and the pixel values of the R-pixel, the G-pixel, and the B-pixel at the main-scanning position 5 are (85, 85, 85). Thus, the differences between the signal values of the R-pixel, the G-pixel, and the B-pixel obtained by the interpolation processing is 0, reducing the occurrence of coloring.

As described above, according to the present exemplary embodiment, it is possible to provide a mechanism capable of performing correction processing with the occurrence of coloring reduced and without making a correction mark noticeable, even when an abnormal pixel occurs due to a dust particle present at a black edge portion.

In the above-described exemplary embodiments, the examples are illustrated where the front surface reading unit 121 and the back surface reading unit 122 are configured using CCD sensors. However, the aspect of the embodiments is not limited to these examples. Either the front surface reading unit 121 or the back surface reading unit 122 may be configured using a contact image sensor (CIS). Alternatively, both the front surface reading unit 121 and the back surface reading unit 122 may be configured using CISs.

In the above-described exemplary embodiments, the examples are illustrated that determine whether a pixel-of-interest position corresponds to an edge portion of an image based on whether a difference between signal values is detected by the difference detection unit 501 via the determination processing unit 502. However, the aspect of the embodiments is not limited to these examples. For example, it may be determined whether a pixel-of-interest position corresponds to an edge portion of an image by another method using an edge detection filter.

The aspect of the embodiments can also be implemented by processing in which a program for implementing one or more functions according to the above-described exemplary embodiments is supplied to a system or apparatus via a network or storage medium and in which one or more processors in a computer of the system or apparatus read and execute the program. Besides, the disclosure can also be implemented by a circuit (e.g., an application specific integrated circuit (ASIC)) for implementing one or more functions according to the above-described exemplary embodiments.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-008775, filed Jan. 22, 2020, which is hereby incorporated by reference herein in its entirety.

What is claimed is:

1. An apparatus comprising:
    a reading unit configured to read an image on a document and generate a plurality of pieces of pixel data of a plurality of colors;
    a detection unit configured to detect, for each color, an abnormal pixel that is not present in the image;
    a determination unit configured to determine whether the detected abnormal pixel is a pixel located at an edge portion; and
    a correction unit configured to correct a piece of pixel data of a first color of which the abnormal pixel is detected in the first color without correcting a piece of pixel data of a second color of which the abnormal pixel is not detected in the second color, in the generated pieces of pixel data in a case where the determination unit determines the detected abnormal pixel is a pixel other than the pixel located at the edge portion, and to correct a plurality of pieces of pixel data of all colors at a position where the abnormal pixel is detected in the generated plurality of pieces of pixel data in a case where the determination unit determines the detected abnormal pixel is the pixel located at the edge portion.

2. The apparatus according to claim 1, wherein the correction unit corrects the piece of pixel data of the first color, the abnormal pixel being detected in the first color based on a plurality of pieces of pixel data on pixels adjacent to the detected abnormal pixel.

3. The apparatus according to claim 1, wherein the determination unit determines whether the detected abnormal pixel is the pixel located at the edge portion based on a difference between pixel values of a plurality of pixels adjacent to the detected abnormal pixel.

4. The apparatus according to claim 3, wherein the detected abnormal pixel is determined to be the pixel located at the edge portion with the difference between the pixel values of the plurality of pixels adjacent to the detected abnormal pixel higher than a predetermined value, and wherein the detected abnormal pixel is determined to be a pixel other than the pixel located at the edge portion with the difference between the pixel values of the plurality of pixels adjacent to the detected abnormal pixel lower than or equal to the predetermined value.

5. The apparatus according to claim 1, wherein the reading unit reads the image on the document using a first light-receiving element, a second light-receiving element, and a third light-receiving element, and generates the plurality of pieces of pixel data of the plurality of colors.

6. The apparatus according to claim 5, wherein the first light-receiving element, the second light-receiving element, and the third light-receiving element are arranged in a staggered manner.

7. The apparatus according to claim 5, wherein the first light-receiving element is an R-sensor, the second light-receiving element is a G-sensor, and the third light-receiving element is a B-sensor.

8. The apparatus according to claim 1, further comprising a printing unit configured to execute printing based on the generated plurality of pieces of pixel data of the plurality of colors.

9. The apparatus according to claim 1, further comprising a transmission unit configured to transmit the generated plurality of pieces of pixel data of the plurality of colors.

10. A method of controlling an apparatus, comprising:
    reading an image on a document and generating a plurality of pieces of pixel data corresponding to a plurality of colors;
    detecting, for each color, an abnormal pixel that is not present in the image;
    determining whether the detected abnormal pixel is a pixel located at an edge portion; and
    correcting a piece of pixel data of a first color of which the abnormal pixel is detected in the first color without correcting a piece of pixel data of a second color of which the abnormal pixel being not detected in the second color, in the generated plurality of pieces of pixel data in a case where it is determined that the detected abnormal pixel is a pixel other than the pixel located at the edge portion, and correcting a plurality of pieces of pixel data of all colors at a position where the abnormal pixel is detected in the generated plurality of pieces of pixel data in a case where it is determined that the detected abnormal pixel is determined to be the pixel located at the edge portion.

11. The method according to claim 10, wherein the correcting corrects the piece of pixel data of the first color, the abnormal pixel being detected in the first color based on a plurality of pieces of pixel data on pixels adjacent to the detected abnormal pixel.

12. The method according to claim 10, wherein the determining determines whether the detected abnormal pixel is the pixel located at the edge portion based on a difference between pixel values of a plurality of pixels adjacent to the detected abnormal pixel.

13. The method according to claim 10, wherein the reading reads the image on the document using a first light-receiving element, a second light-receiving element, and a third light-receiving element, and generates the plurality of pieces of pixel data of the plurality of colors.

14. The method according to claim 10, further comprising executing printing based on the generated plurality of pieces of pixel data of the plurality of colors.

15. A non-transitory computer-readable storage medium storing a program that, when executed by a computer, causes the computer to perform a method of controlling an apparatus including a reading unit configured to read an image on a document and generate a plurality of pieces of pixel data of a plurality of colors, the method comprising:
    detecting, for each color, an abnormal pixel that is not present in the image;
    determining whether the detected abnormal pixel is a pixel located at an edge portion; and correcting a piece of pixel data of a first color of which the abnormal pixel being detected in the first color without correcting a piece of pixel data of a second color of which the abnormal pixel being not detected in the second color, in the generated plurality of pieces of pixel data in a case where it is determined that the detected abnormal pixel is a pixel other than the pixel located at the edge portion, and correcting a plurality of pieces of pixel data of all colors at a position where the abnormal pixel is detected in the plurality of pieces of pixel data generated by the reading unit in a case where it is determined that the detected abnormal pixel is the pixel located at the edge portion.

16. The non-transitory computer-readable storage medium according to claim 15, wherein the correcting corrects the piece of pixel data of the first color, the abnormal pixel being detected in the first color based on a plurality of pieces of pixel data on pixels adjacent to the detected abnormal pixel.

17. The non-transitory computer-readable storage medium according to claim 15, wherein the determining determines whether the detected abnormal pixel is the pixel located at the edge portion based on a difference between pixel values of a plurality of pixels adjacent to the detected abnormal pixel.

18. The non-transitory computer-readable storage medium according to claim 15, wherein the reading reads the image on the document using a first light-receiving element, a second light-receiving element, and a third light-receiving element, and generates the plurality of pieces of pixel data of the plurality of colors.

19. The non-transitory computer-readable storage medium according to claim 15, further comprising executing printing based on the generated plurality of pieces of pixel data of the plurality of colors.

* * * * *